(12) United States Patent
Shimizu et al.

(10) Patent No.: US 7,122,226 B2
(45) Date of Patent: Oct. 17, 2006

(54) LIQUID CRYSTAL ALIGNING AGENT

(75) Inventors: Shigeo Shimizu, Tokyo (JP); Yoshihisa Ohta, Tokyo (JP)

(73) Assignee: JSR Corporation, Tokyo (JP)

( * ) Notice: Subject to any disclaimer, the term of this patent is extended or adjusted under 35 U.S.C. 154(b) by 40 days.

(21) Appl. No.: 10/424,728

(22) Filed: Apr. 29, 2003

(65) Prior Publication Data

US 2004/0031950 A1 Feb. 19, 2004

(30) Foreign Application Priority Data

Apr. 30, 2002 (JP) ............................. 2002-128209
Apr. 18, 2003 (JP) ............................. 2003-113959

(51) Int. Cl.
*C09K 19/56* (2006.01)
*G02F 1/1337* (2006.01)

(52) U.S. Cl. ..................... 428/1.1; 428/1.25; 428/1.26; 428/1.27; 252/299.4; 349/130

(58) Field of Classification Search ................. 428/1.1, 428/1.28, 1.23, 1.25, 1.26, 1.27, 1.2; 252/299.01, 252/299.4; 349/130
See application file for complete search history.

(56) References Cited

U.S. PATENT DOCUMENTS

| | | | | |
|---|---|---|---|---|
| 5,384,069 A | * | 1/1995 | Yoshinaga et al. | 252/299.01 |
| 5,612,450 A | * | 3/1997 | Mizushima et al. | 528/353 |
| 5,700,860 A | * | 12/1997 | Nishikawa et al. | 524/317 |
| 5,929,201 A | * | 7/1999 | Gibbons et al. | 528/353 |
| 5,969,055 A | * | 10/1999 | Nishikawa et al. | 525/419 |
| 6,081,057 A | * | 6/2000 | Tanaka et al. | 310/90 |
| 6,103,322 A | * | 8/2000 | Gibbons et al. | 428/1.25 |
| 6,143,380 A | * | 11/2000 | Gibbons et al. | 428/1.27 |
| 6,194,039 B1 | * | 2/2001 | Gibbons et al. | 428/1.1 |
| 6,224,788 B1 | * | 5/2001 | Ogawa et al. | 252/299.4 |
| 6,238,752 B1 | * | 5/2001 | Kato et al. | 428/1.26 |
| 6,294,639 B1 | * | 9/2001 | Sawahata et al. | 528/170 |
| 6,312,769 B1 | * | 11/2001 | Hiraoka et al. | 428/1.1 |
| 6,562,420 B1 | * | 5/2003 | Liu et al. | 428/1.1 |
| 6,649,283 B1 | * | 11/2003 | Lupo et al. | 428/690 |
| 6,746,730 B1 | * | 6/2004 | Tanioka et al. | 428/1.1 |

FOREIGN PATENT DOCUMENTS

| | | |
|---|---|---|
| EP | 0 503 918 A1 | 9/1992 |
| JP | 05-107544 | 4/1993 |
| JP | 05-150245 | 6/1993 |
| JP | 06-222366 | 8/1994 |
| JP | 06-281937 | 10/1994 |
| WO | WO 01/00732 A1 | 1/2001 |

OTHER PUBLICATIONS

Patent Abstracts of Japan, JP 2002-062537, Feb. 28, 2002.
Patent Abstracts of Japan, JP 2002-020754, Jan. 23, 2002.

* cited by examiner

*Primary Examiner*—Shean C. Wu
(74) *Attorney, Agent, or Firm*—Oblon, Spivak, McClelland, Maier & Neustadt, P.C.

(57) ABSTRACT

To provide a liquid crystal aligning agent which can provide a liquid crystal display element having a liquid crystal alignment film provided with alignability for liquid crystal molecules by rubbing without fail and having excellent liquid crystal alignability. The liquid crystal aligning agent comprises at least one selected from a polyamic acid having a specific structure having 2 or 3 rings, and an imidized polymer of the polyamic acid and further having alkyl group having the main chain with 8 or more carbon atoms, perfluoroalkyl group having the main chain with 3 or more carbon atoms, or 1,1-cycloalkylene group having 6 or more carbon atoms which may be substituted.

13 Claims, No Drawings

LIQUID CRYSTAL ALIGNING AGENT

FIELD OF THE INVENTION

The present invention relates to a liquid crystal aligning agent which is used to form a liquid crystal alignment film for liquid crystal display elements. More specifically, it relates to a liquid crystal aligning agent which has excellent liquid crystal alignability, provides a liquid crystal alignment film having excellent after-image characteristics to a liquid crystal display element and a liquid crystal alignment film having excellent long-term stability to a liquid crystal display element.

DESCRIPTION OF THE PRIOR ART

As a liquid crystal display element, there is currently known a so-called TN (Twisted Nematic) liquid crystal display element having a TN liquid crystal cell which is manufactured by forming a liquid crystal alignment film of a polyamic acid or polyimide on the surface of a substrate having a transparent conductive film to prepare a substrate for a liquid crystal display element, forming a nematic liquid crystal layer having positive dielectric anisotropy between two of the above substrates to prepare a sandwich-structured cell and twisting the long axis of the liquid crystal molecule at 90° continuously from one of the substrates toward the other substrate.

An STN (Super Twisted Nematic) liquid crystal display element which has higher contrast than the TN liquid crystal display element and little dependence on its view angle and a homeotropic alignment liquid crystal display element have been developed. This STN liquid crystal display element is produced by using liquid crystals prepared by blending nematic liquid crystals with a chiral agent which is an optically active substance and making use of a birefringence effect which is obtained when the long axis of the liquid crystal molecule is continuously twisted at 180° or more between the substrates.

However, when a TN liquid crystal display element is manufactured by using a liquid crystal aligning agent which contains a conventionally known polyamic acid or an imide-based polymer having a structure obtained by dehydrating and ring-closing the polyamic acid, ionic charge generated at the time of displaying an image (applying a voltage) and adsorbed to the liquid crystal alignment film is not desorbed from the liquid crystal alignment film even after the image is erased (after the application of voltage is canceled), whereby the voltage remains and accumulates in the liquid crystal alignment film after the cancellation of voltage application, thereby causing an after-image on the display screen after the cancellation of voltage application. That is, when this after-image occurs, the difference between light and shade at the time of applying voltage and canceling voltage application becomes small, thereby making it impossible to obtain high contrast. Therefore, the development of a liquid crystal aligning agent which can provide a liquid crystal display element free from an after-image has been desired.

Attempts have recently been made to substitute a conventionally used glass substrate for a resin substrate in order to reduce the weight of a liquid crystal display element. Since the resin substrate has low heat resistant temperature, baking for forming a liquid crystal alignment film must be carried out at a lower temperature than usual. When the baking temperature is low, the pretilt angle stability, reliability and rubbing resistance of a liquid crystal alignment film greatly deteriorate. Therefore, the development of a liquid crystal aligning agent which can provide a liquid crystal display element having excellent pretilt angle stability, reliability and rubbing resistance has been desired.

Since a liquid crystal device is becoming smaller and smaller in size and the intensity of light from a light source is becoming higher and higher, the intensity of light received by a liquid crystal display element becomes high or the temperature of the liquid crystal display element becomes high. Therefore, a liquid crystal display element comprising an alignment film made from the conventionally used polyimide has problems such as the deterioration of the alignment film and a reduction in the service life of the product.

SUMMARY OF THE INVENTION

It is a first object of the present invention which has been made in view of the above situation to provide a liquid crystal aligning agent which can provide a liquid crystal display element having a liquid crystal alignment film provided with alignability for liquid crystal molecules by rubbing without fail and having excellent liquid crystal alignability.

It is a second object of the present invention to provide a liquid crystal aligning agent which provides a liquid crystal alignment film for a liquid crystal display element having excellent pretilt angle stability.

It is a third object of the present invention to provide a liquid crystal aligning agent which provides a liquid crystal alignment film for a liquid crystal alignment element having excellent after-image characteristics.

It is a fourth object of the present invention to provide a liquid crystal aligning agent capable of forming a liquid crystal display element having excellent reliability.

It is a fifth object of the present invention to provide a liquid crystal aligning agent capable of forming a liquid crystal display element having excellent rubbing resistance.

It is a sixth object of the present invention to provide a liquid crystal aligning agent capable of forming a liquid crystal display element having excellent light resistance and heat resistance.

Other objects and advantages of the present invention will become apparent from the following description.

According to the present invention, firstly, the above objects and advantages of the present invention are attained by a liquid crystal aligning agent comprising at least one selected from a polyamic acid which satisfies both of the following conditions (1) and (2) and an imidized polymer of the polyamic acid:

(1) it has at least one structure selected from the group consisting of structures represented by the following formulas (1) to (10) (to be referred to as "specific structure (1)" hereinafter); and (2) it has at least one structure selected from the group consisting of groups represented by A to D (to be referred to as "specific structure (2)" hereinafter):

A: alkyl group having the main chain with 8 or more carbon atoms, perfluoroalkyl group having the main chain with 3 or more carbon atoms, or 1,1-cycloalkylene group having 6 or more carbon atoms which may be substituted B: group having a polycyclic structure having 3 or more rings C: group represented by —R—X—A (wherein R is a hydrocarbon group having 3 or more carbon atoms, X is a single bond or bonding group represented by —O—, —CO—, —COO—, —OCO—, —NH—, —NHCO—, —CONH— or —S—, and A is a halogen atom, cyano group, fluoroalkyl group or chromanyl group which may be substituted)

D: group represented by —R¹—X¹—R²—X²—R³ (wherein R¹ to R³ are each independently a hydrocarbon group having 3 or more carbon atoms which may be substituted or —(Si—O—)$_n$ (wherein n is an integer of 5 or more), and X¹ and X² are each independently a single bond or bonding group represented by —O—, CO—, —COO—, —OCO—, —NH—, —NHCO, —CONH— or —S—,

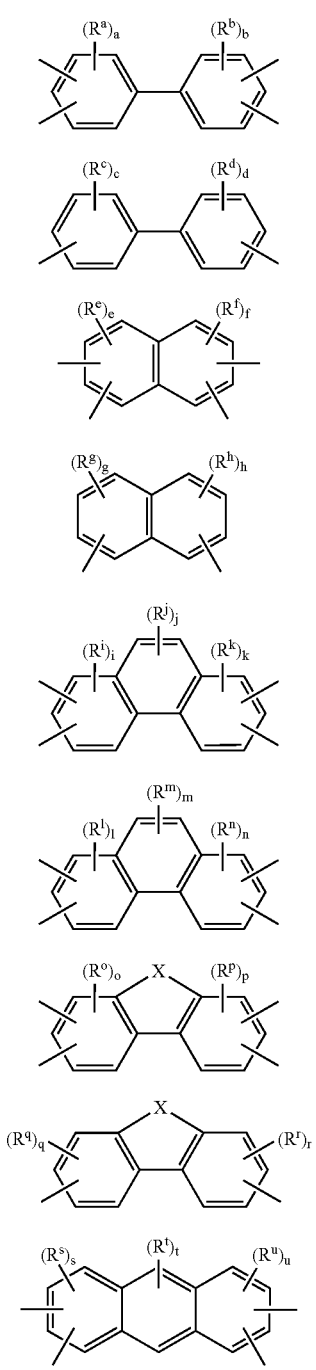

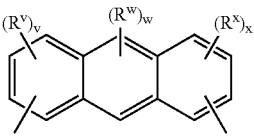

wherein $R^a$ to $R^x$ are each independently a halogen atom or monovalent organic group, X is a monovalent organic group or oxygen atom, a, b, g, h, l, n, q, r, v and x are each independently an integer of 0 to 3, e, f, i, j, k, m, o, p, s, t, u and w are each independently an integer of 0 to 2, and c and d are each independently an integer of 0 to 4.

DETAILED DESCRIPTION OF THE PREFERRED EMBODIMENT

The present invention will be described in detail hereinbelow. The polyamic acid used in the present invention is synthesized by reacting a tetracarboxylic dianhydride with a diamine compound in an organic solvent. The imidized polymer used in the present invention can be obtained by dehydrating and ring-closing the above polyamic acid. The polyamic acid and the imidized polymer may be used as a mixture of two or more polyamic acids and a mixture of two or more imidized polymers, respectively, or in combination. Particularly preferably, the liquid crystal aligning agent of the present invention comprises an imidized polymer having an imidization rate of 40% or more. The term "imidization rate" as used herein means the percentage of a recurring unit having an imide ring based on the total of all the recurring units of the polymer.

The specific structure (1) is introduced into the polyamic acid and the imidized polymer when at least one of the tetracarboxylic dianhydride and the diamine compound has the specific structure (1). A diamine compound having the specific structure (1) is particularly preferably used.

The specific structure (2) is introduced into the polyamic acid and the imidized polymer when at least one of the tetracarboxylic dianhydride and the diamine compound has the specific structure (2). A diamine compound having the specific structure (2) is particularly preferably used.

The specific structure (1) has the marked effect of improving the after-image characteristics of a liquid crystal display element and also the effect of improving reliability, rubbing resistance, light resistance and heat resistance to improve the electric stability and product service life of a liquid crystal display element. A structure represented by the above formula (1) or (2) is preferred and a structure represented by the above formula (2) is more preferred as the specific structure (1). As for the content of the specific structure (1) in the polyamic acid and/or the imidized polymer used in the present invention, the amount of a recurring unit having the specific structure (1) is preferably 5 to 95 mol %, more preferably 10 to 80 mol %, particularly preferably 10 to 70 mol % based on the total of all the recurring units of the polymers.

The specific structure (2) has the effect of developing a pretilt angle in a liquid crystal display element stably. Preferred examples of the specific structure (2) are groups represented by the following formulas (a) to (z):

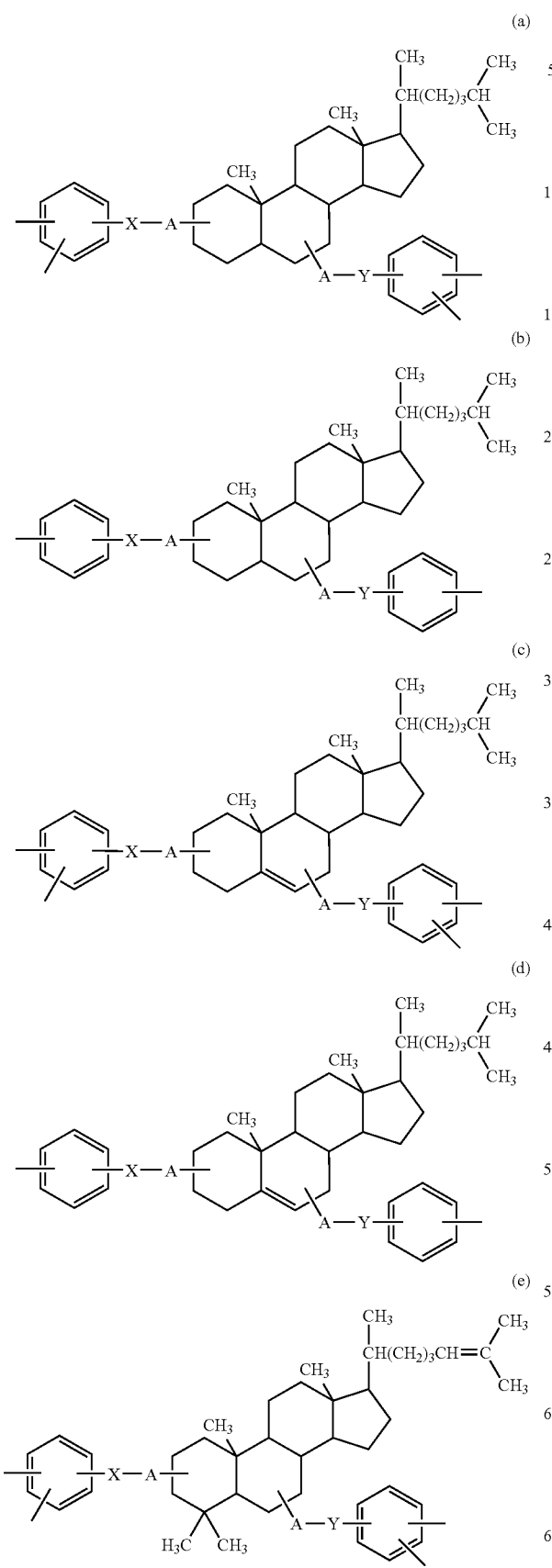
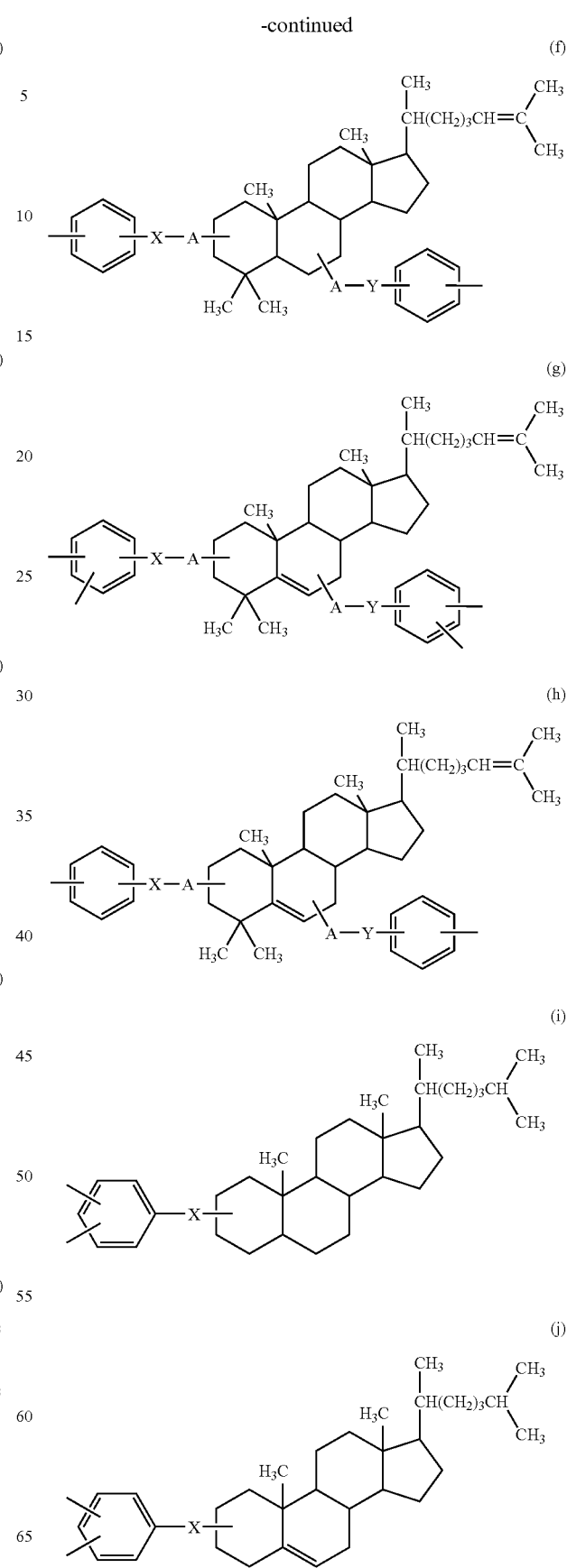

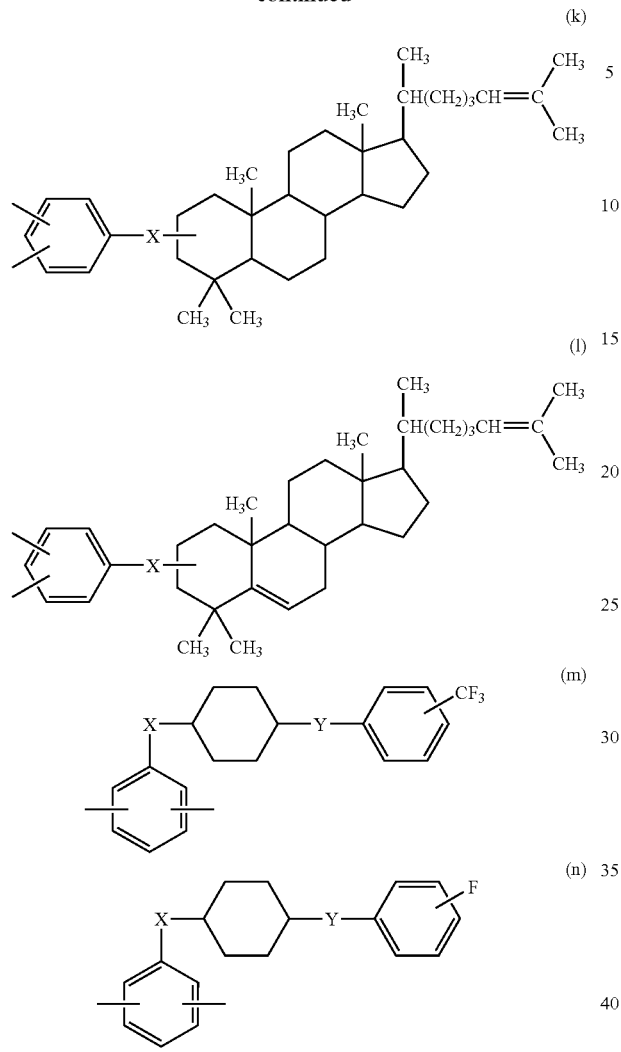
wherein A is a phenylene group or single bond, and X and Y are each independently a divalent group selected from the group consisting of —O—, —CO—, —COO—, —OCO—, —NHCO—, —CONH—, —S—, —Ar—Ar—CH₂ (wherein Ar is a phenylene group), methylene group, alkylene group having 2 to 6 carbon atoms and phenylene group,
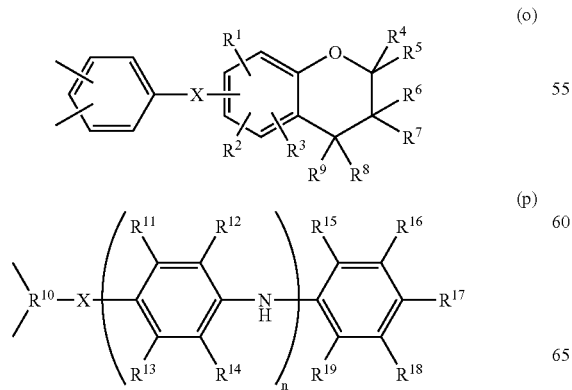

-continued (z)

wherein X and Y are each independently a divalent group selected from the group consisting of —O—, —CO—, —COO—, —OCO—, —NHCO—, —CONH—, —S—, —Ar—Ar—CH$_2$ (wherein Ar is a phenylene group), methylene group, alkylene group having 2 to 6 carbon atoms and phenylene group, Z is a monovalent organic group selected from the group consisting of —CF$_3$, —CN, —COCH$_3$, —COOH, —NO$_2$, —SOCH$_3$, —SO$_2$CH$_3$, —F, —Cl and —OCF$_3$, $R^1$ to $R^9$, $R^{11}$ to $R^{19}$, $R^{21}$, $R^{23}$, $R^{24}$, $R^{25}$ and $R^{27}$ to $R^{33}$ are each independently a halogen atom or monovalent organic group, $R^{20}$, $R^{22}$ and $R^{26}$ are each independently a divalent organic group, $R^{10}$ is a tervalent organic group, and m and n are each an integer of 1 or more.

As for the content of the specific structure (2) in the polyamic acid and/or the imidized polymer used in the present invention which differs according to the type of the targeted liquid crystal display element, in a TN or STN liquid crystal display element, the amount of the recurring unit having the specific structure (2) is preferably 0.1 to 50 mol %, more preferably 0.1 to 20 mol %, particularly preferably 0.5 to 10 mol % based on the total of all the recurring units of the polymers. In a homeotropic alignment liquid crystal display element, it is preferably 5 to 80 mol %, more preferably 5 to 50 mol %, particularly preferably 5 to 30 mol %.

Tetracarboxylic Dianhydride

Examples of the tetracarboxylic dianhydride having the specific structure (1) out of tetracarboxylic dianhydrides used for the synthesis of the polyamic acid include 3,3',4,4'-biphenyltetracarboxylic dianhydride, 1,4,5,8-naphthalenetetracarboxylic dianhydride, 2,3,6,7-naphthalenetetracarboxylic dianhydride, 2,3,6,7-phenanthrenetetracarboxylic dianhydride, 3,4,5,6-fluorenetetracarboxylic dianhydride and 2,3,6,7-anthracenetetracarboxylic dianhydride.

Examples of the tetracarboxylic dianhydride having the specific structure (2) include compounds represented by the following formulas (11) to (18).

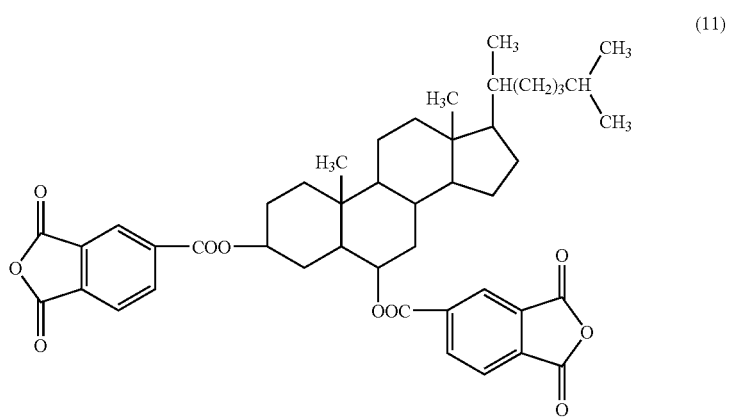

(11)

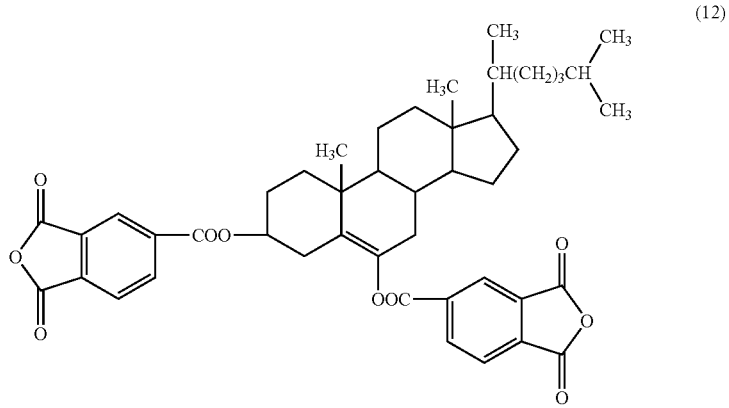

(12)

-continued
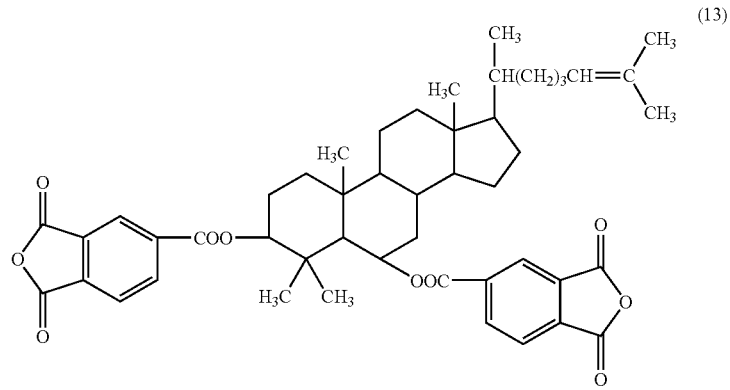
(13)
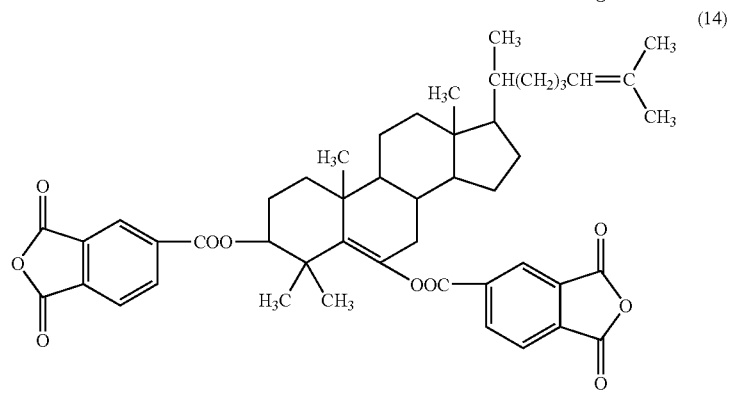
(14)
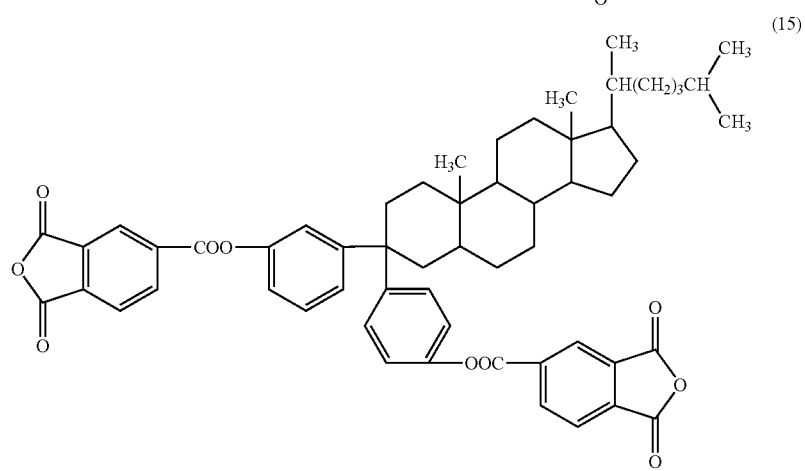
(15)
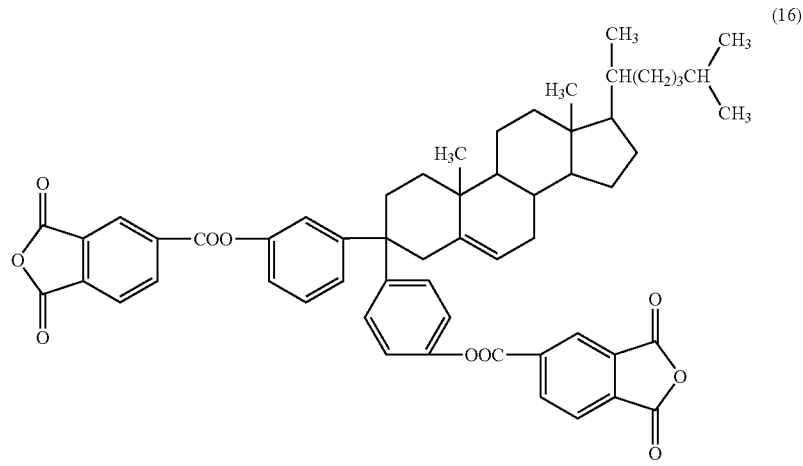
(16)

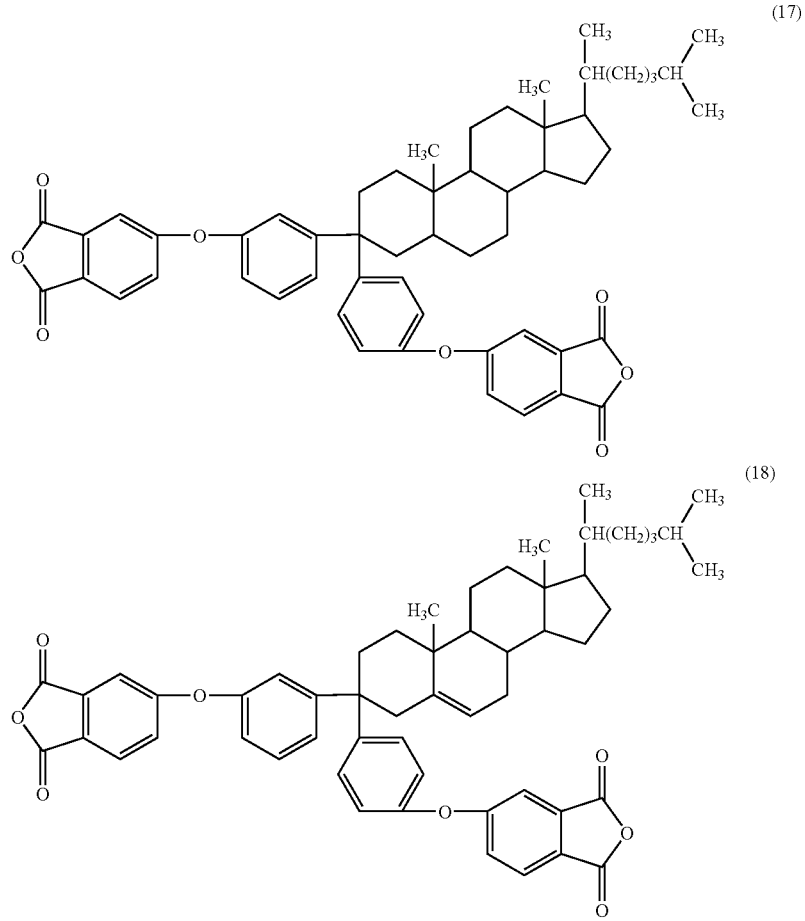

A tetracarboxylic dianhydride other than the compounds having the above specific structure (1) or the above specific structure (2) may also be used in the present invention. Examples of the tetracarboxylic dianhydride include aliphatic and alicyclic tetracarboxylic dianhydrides such as butanetetracarboxylic dianhydride, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4-cyclopentanetetracarboxylic dianhydride, 1,2,4,5-cyclohexanetetracarboxylic dianhydride, 3,3',4,4'-dicyclohexyltetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5(tetrahydro-2,5-dioxo-3-furanyl)-naphtho[1,2-c]-furan-1,3-dione, 1,3,3a,4,5,9b-hexahydro-5-methyl-5(tetrahydro-2,5-dioxo-3-furanyl)-naphtho[1,2-c]-furan-1,3-dione, 1,3,3a,4,5,9b-hexahydro-5-ethyl-5(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, 5-(2,5-dioxotetrahydrofural)-3-methyl-3-cyclohexene-1,2-dicarboxylic dianhydride, bicycle[2.2.2]-oct-7-ene-2,3,5,6-tetracarboxylic dianhydride, 3-oxabicyclo[3.2.1]octane-2,4-dione-6-spiro-3'-(tetrahydrofuran-2',5'-dione), (4arH,8arH)-decahydro-1t,4t:5c,8c-dimethanonaphthalene-2t,3t,6c,7c-tetracarboxylic dianhydride, and compounds represented by the following formulas (I) and (II):

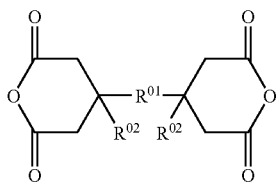

(I)

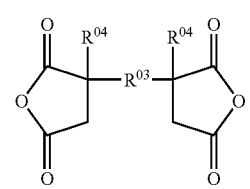

(II)

($R^{01}$ and $R^{03}$ are each a divalent organic group having an aromatic ring, and $R^{02}$ and $R^{04}$ are each a hydrogen atom or alkyl group, with the proviso that a plurality of $R^{02}$'s and a plurality of $R^{04}$'s may be the same or different); and aromatic tetracarboxylic dianhydrides such as pyromellitic dianhydride, 3,3',4,4'-benzophenonetetracarboxylic dianhydride, 3,3',4,4'-biphenylsulfonetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3'4,4'-perfluoroisopropylidenediphthalic dianhydride, bis(phthalic acid)phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate) and 2,2-bis(4-hydroxyphenyl)propane-bis(anhydrotrimellitate). They may be used alone or in combination of two or more.

Out of these, butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 5-(2,5-dioxotetrahydrofural)-3-methyl-3-cyclohexene-1,2-dicarboxylic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 1,3,3a,4,5,9b-hexahydro-5,8-dimethyl-5-(tetrahydro-2,5-dioxo-3-furanyl)-naphtho[1,2-c]furan-1,3-dione, bicyclo[2.2.2]oct-7-ene-2,3,5,6-tetracarboxylic dianhydride, pyromellitic dianhydride, 3,3',4,4'-benzophenonetetracarboxylic dianhydride, 3,3',4,4'-biphenylsulfonetetracarboxylic dianhydride, bicyclo[2.2.2]-oct-7-ene-2,3,5,6-tetracarboxylic dianhydride, 3-oxabicyclo[3.2.1]octane-2,4-dione-6-spiro-3'-(tetrahydrofuran-2',5'-dione), (4arH,8arH)-decahydro-1t,4t:5c,8c-dimethanonaphthalene-2t,3t,6c,7c-tetracarboxylic dianhydride, compounds represented by the following formulas (19) to (21) out of the compounds represented by the above formula (I), and compounds represented by the following formula (21) out of the compounds represented by the above formula (II) are preferred because they can exhibit excellent liquid crystal alignability. Particularly preferred are 1,2,3,4-cyclobutanetetracarboxylic dianhydride, 1,3-dimethyl-1,2,3,4-cyclobutanetetracarboxylic dianhydride, 2,3,5-tricarboxycyclopentylacetic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, bicyclo[2.2.2]-oct-7-ene-2,3,5,6-tetracarboxylic dianhydride, 3-oxabicyclo[3.2.1]octane-2,4-dione-6-spiro-3'-(tetrahydrofuran-2'5'-dione), (4arH,8arH)-decahydro-1t,4t:5c,8c-dimethanonaphthalene-2t,3t,6c,7c-tetracarboxylic dianhydride, pyromellitic dianhydride and compounds represented by the following formula (19).

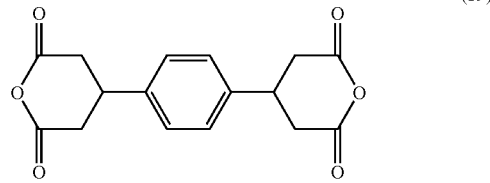

(19)

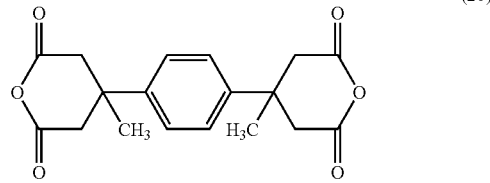

(20)

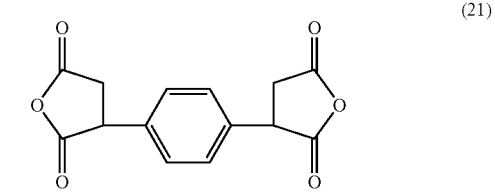

(21)

Diamine Compound

Examples of the diamine compound having the specific structure (1) out of diamine compounds used for the synthesis of the polyamic acid include diamine compounds having a structure represented by the above formula (2) such as 3,3'-dimethyl-4,4'-diaminobiphenyl, 2,2'-dimethyl-4,4'-diaminobiphenyl, 2,2'-ditrifluoromethyl-4,4'-diaminobiphenyl, 3,3'-ditrifluoromethyl-4,4'-diaminobiphenyl, 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 4,4'-bis[(4-amino-2-trifluoromethyl)phenoxy]-octafluorobiphenyl and 4,4'-bis(4-aminophenoxy)biphenyl; diamine compounds having a structure represented by the above formula (4) such as 1,5-diaminonaphthalene and 1,8-diaminonaphthalene; diamine compounds having a structure represented by the above formula (6) such as compounds represented by the following formulas (6-1) to (6-3); diamine compounds having a structure represented by the above formula (8) such as 2,7-diaminofluorene, 2,7-diaminofluorenone and 9,9-bis(4-aminophenyl)fluorene; and diamine compounds having a structure represented by the above formula (10) such as compounds represented by the following formulas (10-1) to (10-2). Out of these, 3,3'-dimethyl-4,4'-diaminobiphenyl, 2,2'-dimethyl-4,4'-diaminobiphenyl, 3,3'-ditrifluoromethyl-4,4'-diaminobiphenyl, 4,4'-diamino-2,2'-bis(trifluoromethyl)biphenyl, 1,5-diaminonaphthalene, 2,7-diaminofluorene, 2,7-diaminofluorenone, 9,9-bis(4-aminophenyl)fluorene and compounds represented by the formulas (6-1) and (10-1) are particularly preferred.

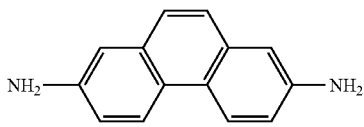
(6-1)
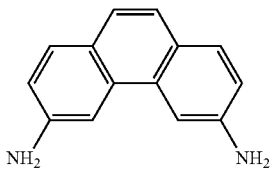
(6-2)
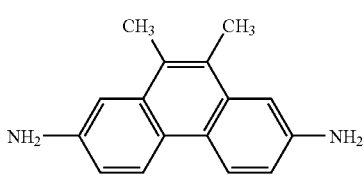
(6-3)
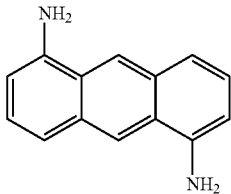
(10-1)
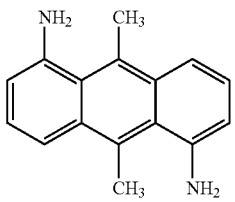
(10-2)
Examples of the diamine compound having the specific structure (2) include compounds represented by the following formulas (22) to (98). Out of these, compounds represented by the following formulas (22), (23), (25), (26), (32), (33), (34), (35) and (40) are particularly preferred.
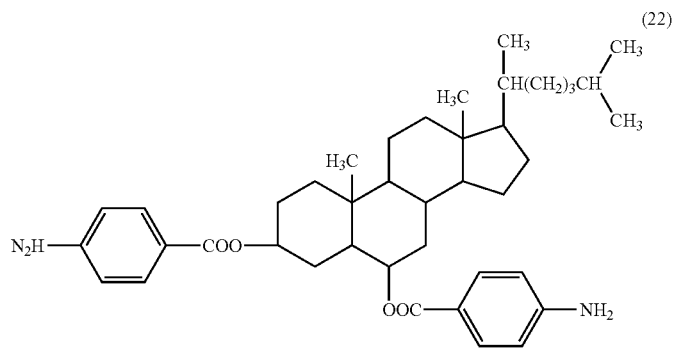
(22)
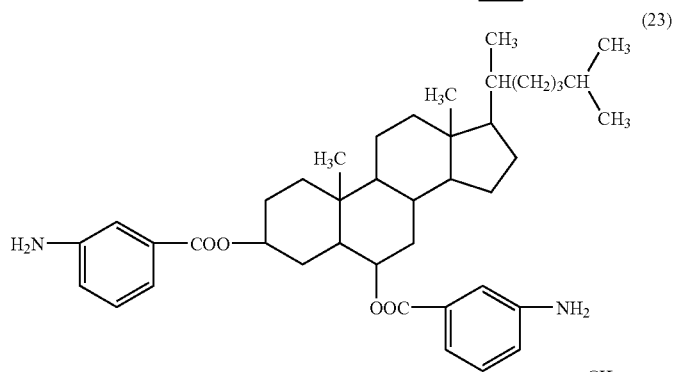
(23)
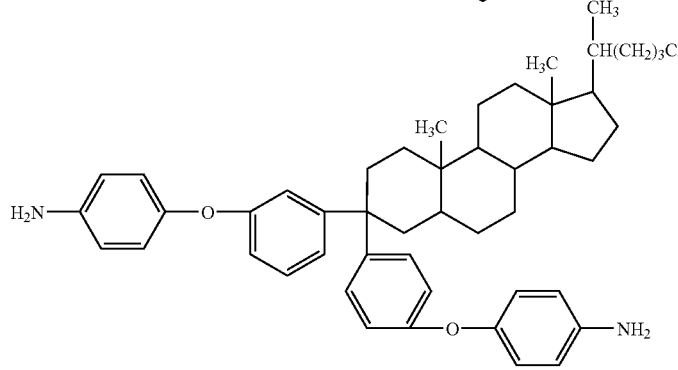
(24)

-continued
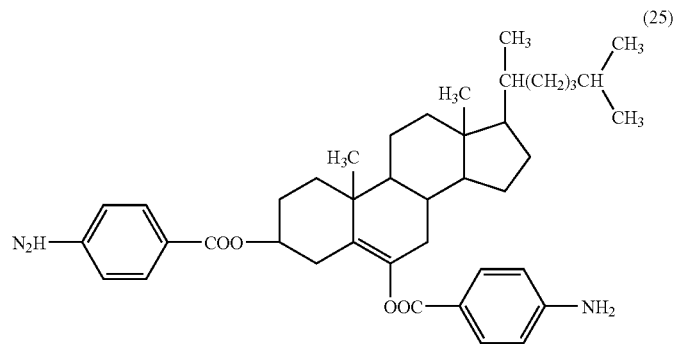
(25)
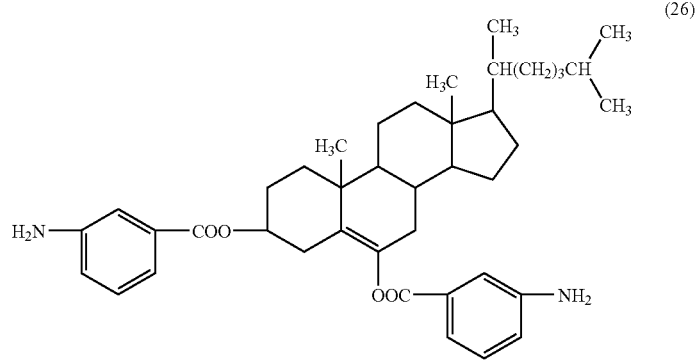
(26)
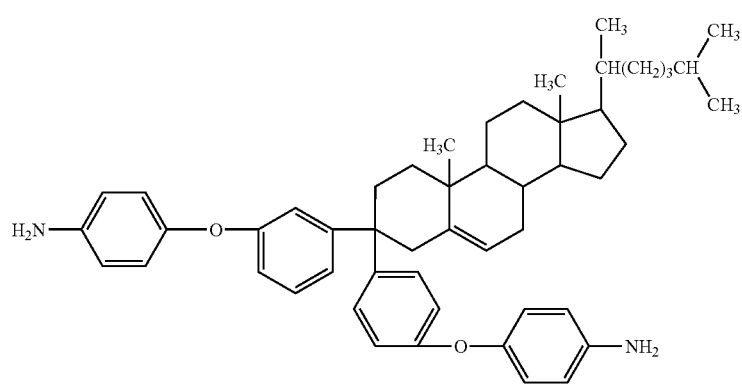
(27)
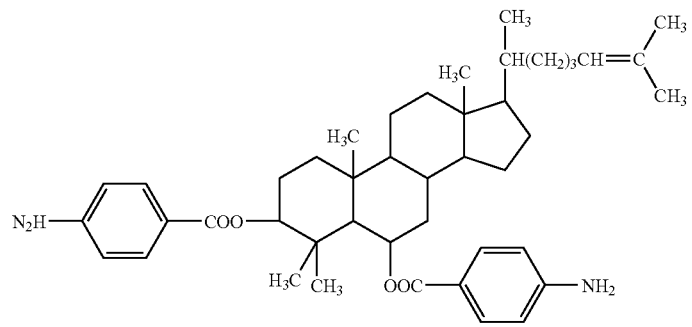
(28)

-continued
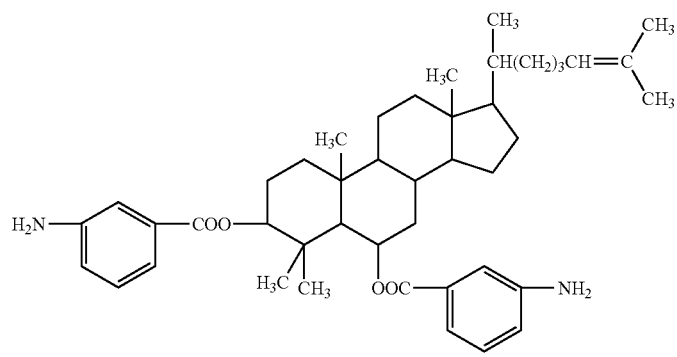
(29)
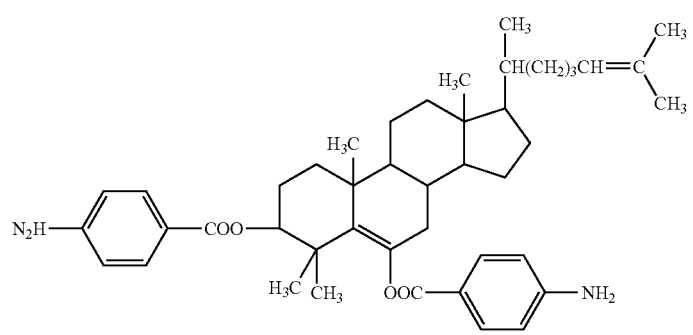
(30)
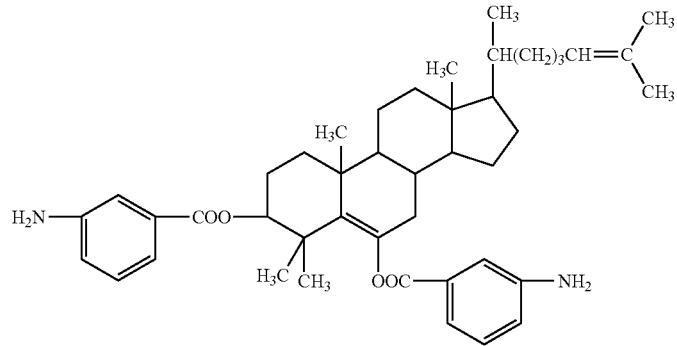
(31)
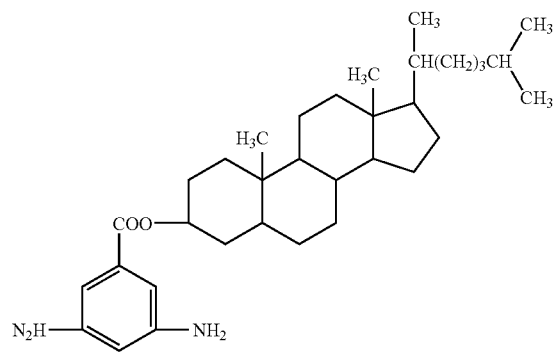
(32)
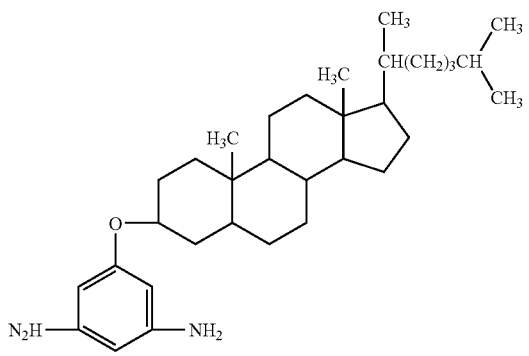
(33)

-continued
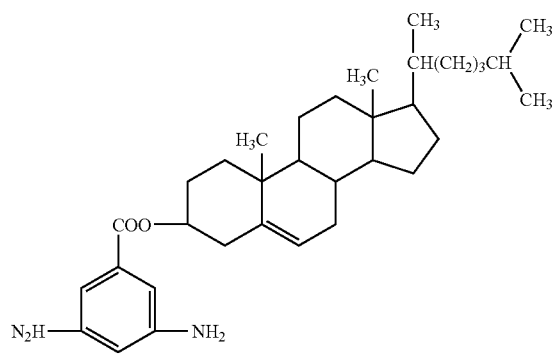
(34)
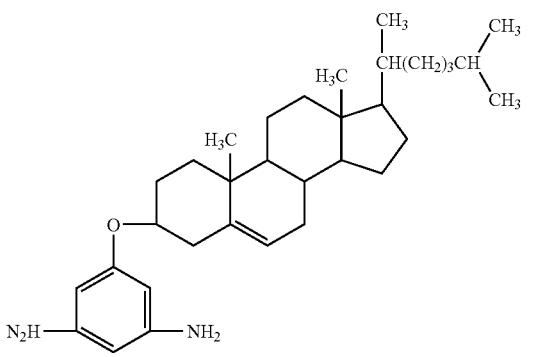
(35)
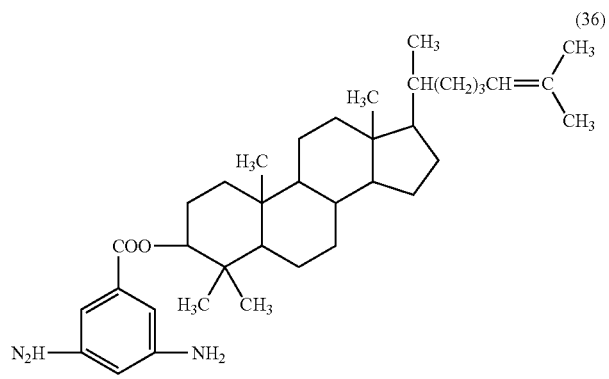
(36)
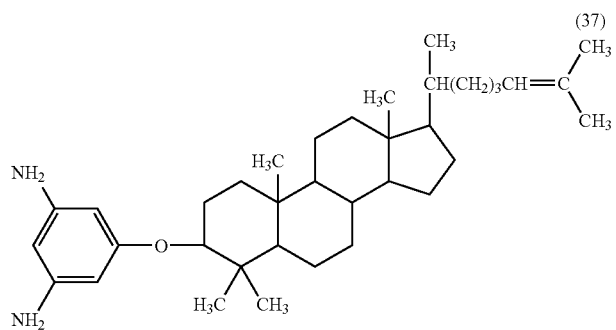
(37)
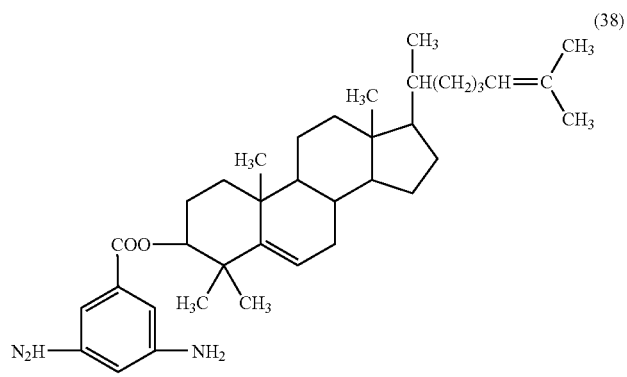
(38)

-continued
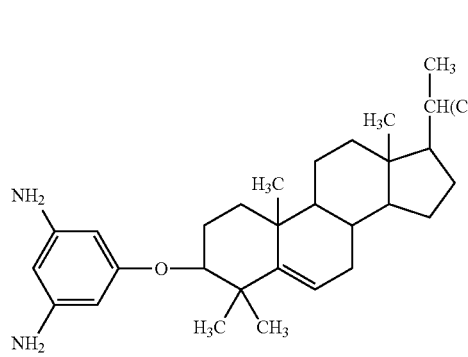
(39)
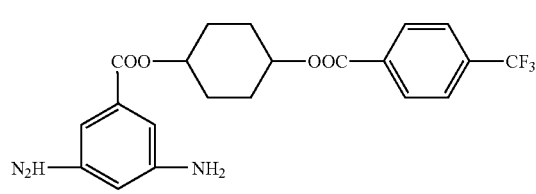
(40)
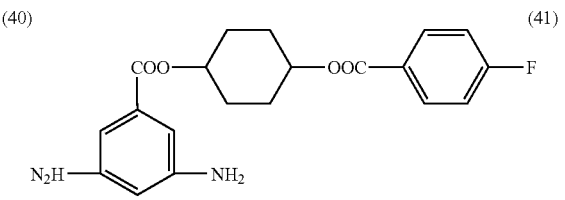
(41)
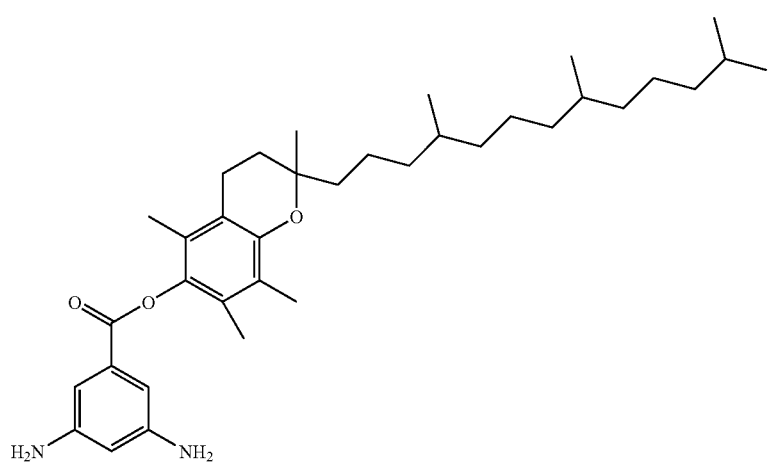
(42)
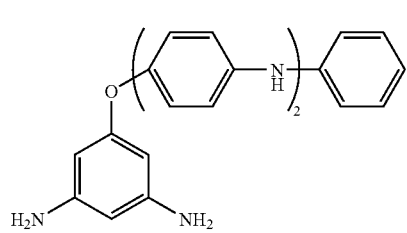
(43)
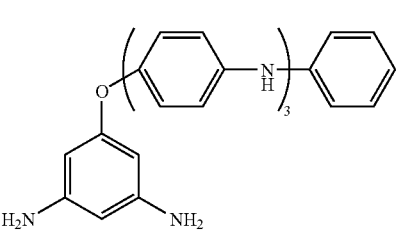
(44)
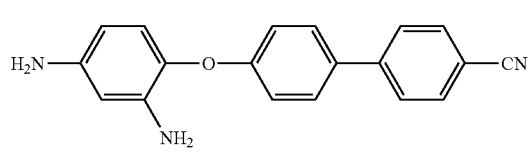
(45)
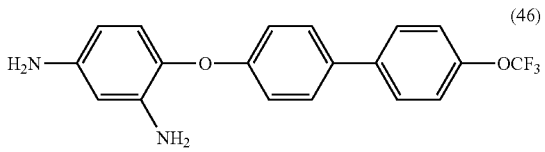
(46)
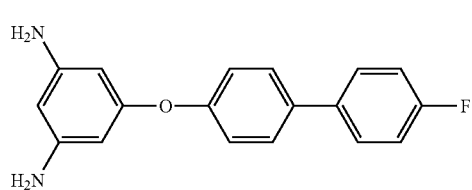
(47)
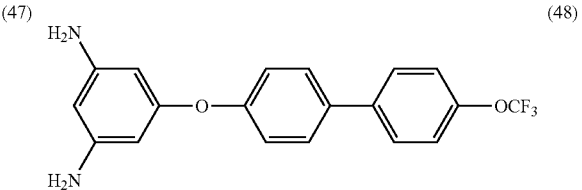
(48)

-continued
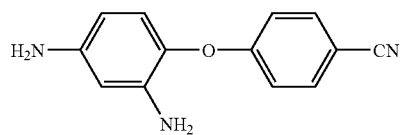 (49)
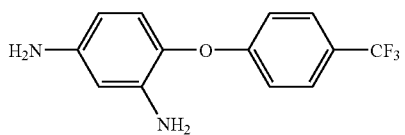 (50)
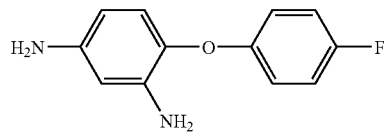 (51)
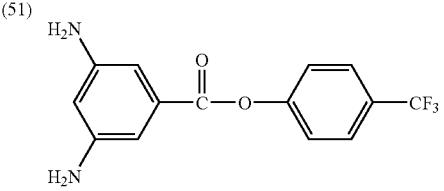 (52)
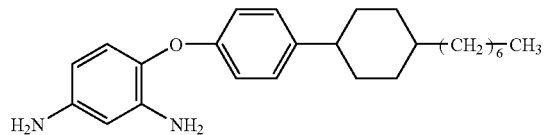 (53)
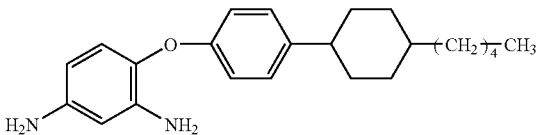 (54)
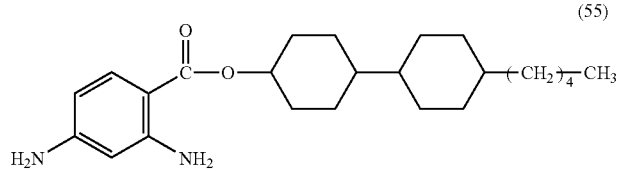 (55)
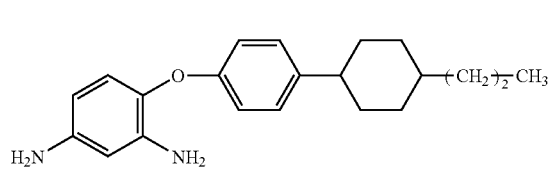 (56)
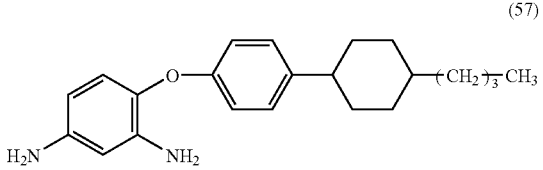 (57)
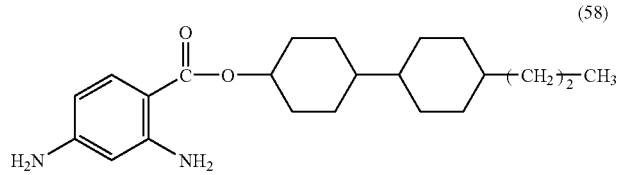 (58)
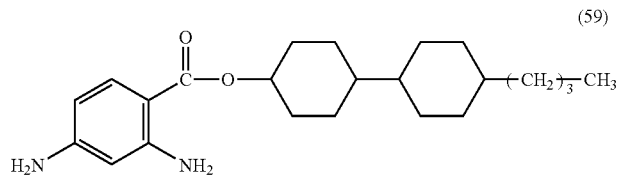 (59)
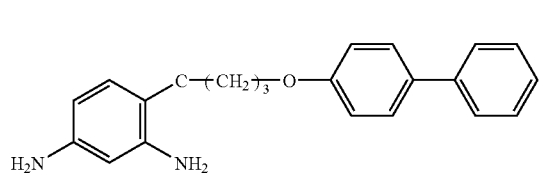 (60)
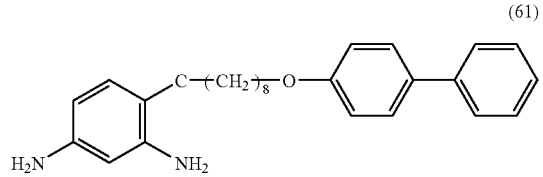 (61)

-continued
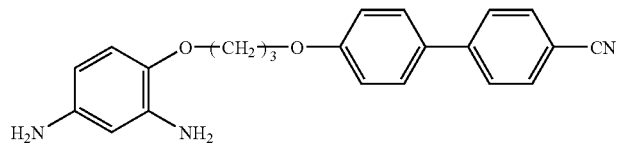
(62)
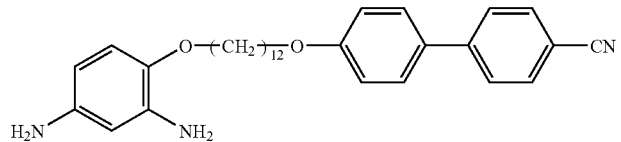
(63)
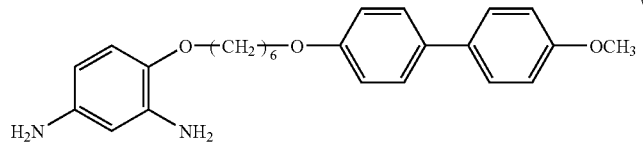
(64)
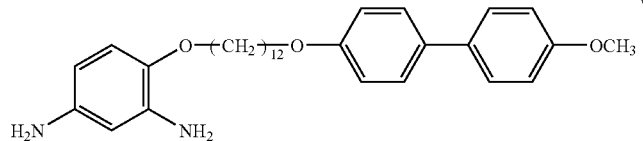
(65)
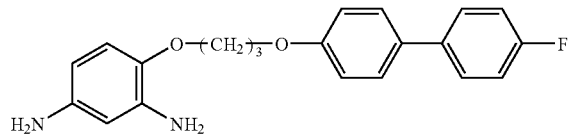
(66)
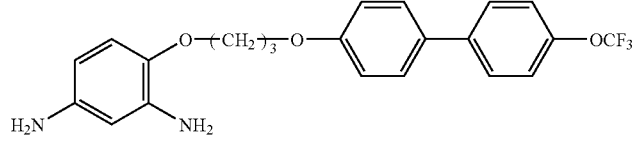
(67)
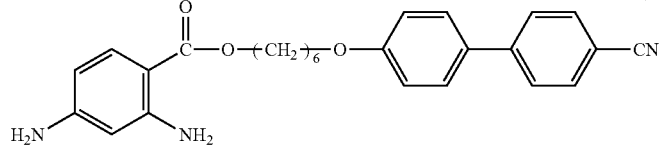
(68)
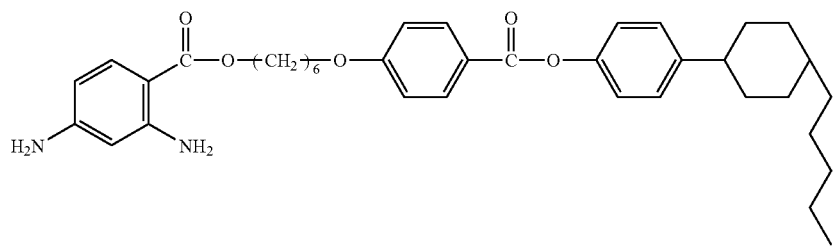
(69)
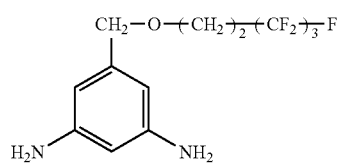
(70)
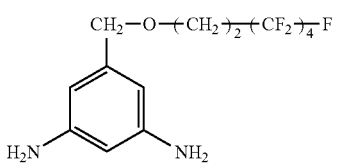
(71)

-continued
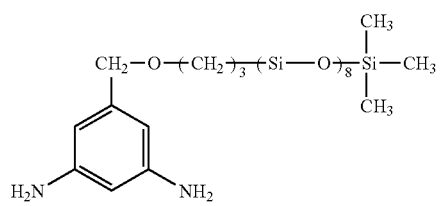 (72)
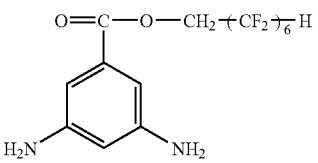 (73)
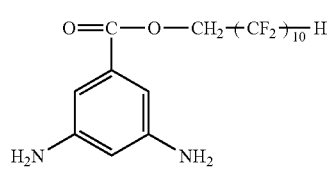 (74)
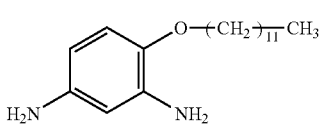 (75)
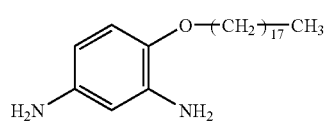 (76)
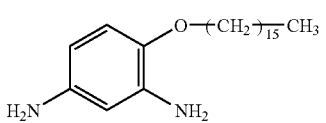 (77)
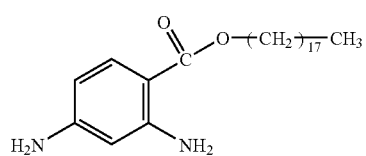 (78)
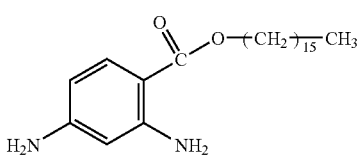 (79)
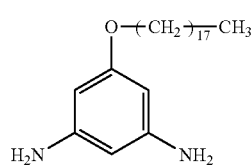 (80)
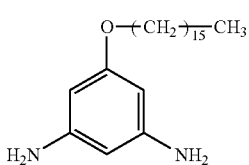 (81)
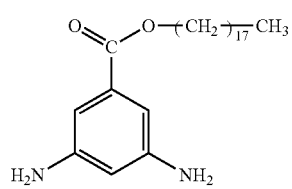 (82)
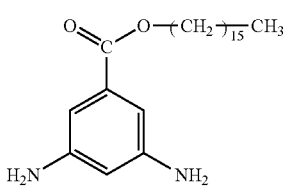 (83)
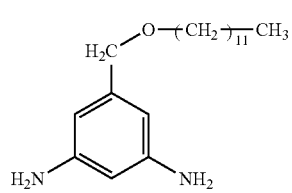 (84)
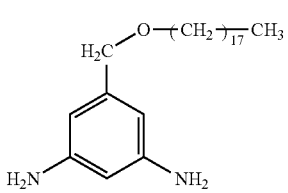 (85)
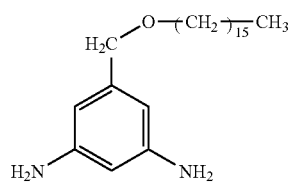 (86)
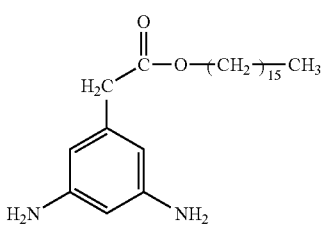 (87)

-continued
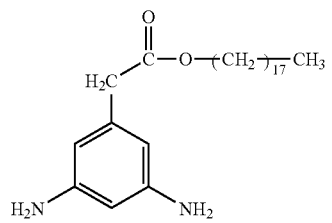
(88)
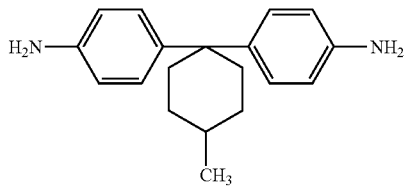
(89)
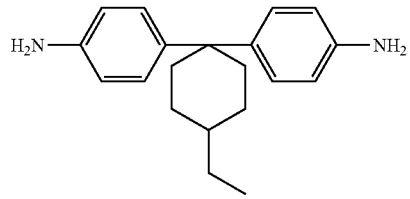
(90)
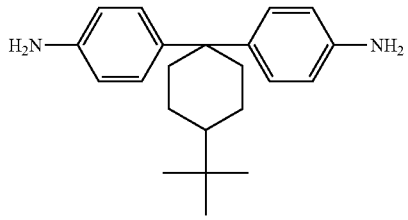
(91)
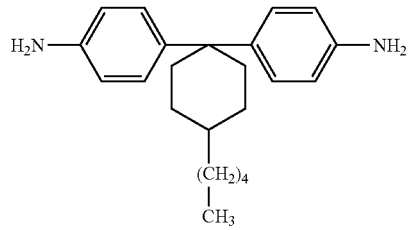
(92)
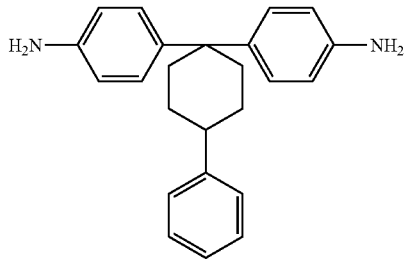
(93)
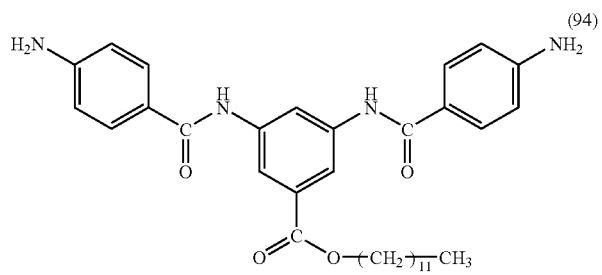
(94)
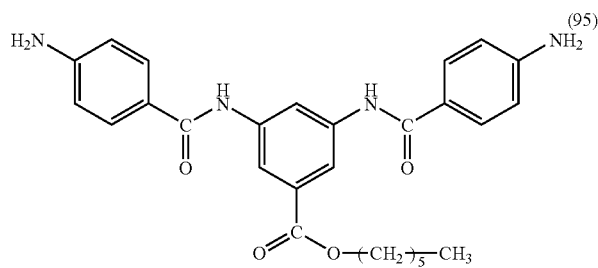
(95)
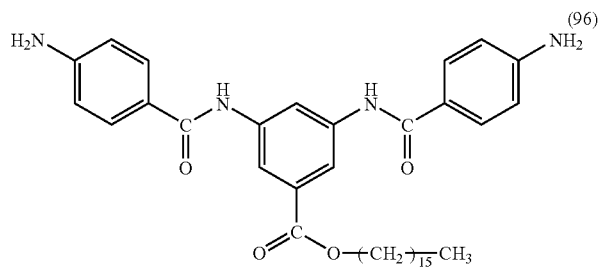
(96)

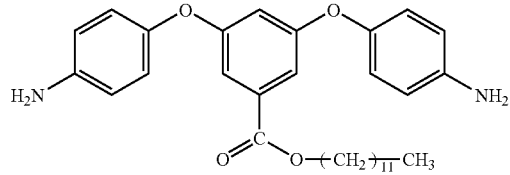
(97)

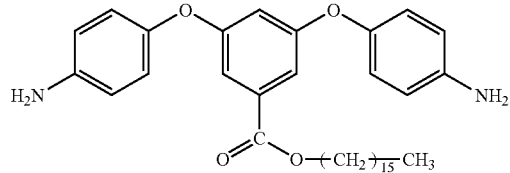
(98)

A diamine compound other than the above compounds having the specific structure (1) or the specific structure (2) may also be used in the present invention. Examples of the diamine compound include aromatic diamines such as p-phenylenediamine, m-phenylenediamine, 4,4'-diaminophenylmethane, 4,4'-diaminodiphenylethane, 4,4'-diaminodiphenylsulfide, 4,4'-diaminodiphenylsulfone, 4,4'-diaminobenzanilide, 4,4'-diaminodiphenyl ether, 5-amino-1-(4'-aminophenyl)-1,3,3-trimethylindane, 6-amino-1-(4'-aminophenyl)-1,3,3-trimethylindane, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 4,4'-methylene-bis(2-chloroaniline), 1,4,4'-(p-phenyleneisopropylidene)bisaniline, 4,4'-(m-phenyleneisopropylidene)bisaniline and 2,2'-bis[4-(4-amino-2-trifluoromethylphenoxy)phenyl]hexafluoropropane; aliphatic and alicyclic diamines such as 1,1-metaxylylenediamine, 1,3-propanediamine, tetramethylenediamine, pentamethylenediamine, hexamethylenediamine, heptamethylenediamine, octamethylenediamine, nonamethylenediamine, 4,4-diaminoheptamethylenediamine, 1,4-diaminocyclohexane, isophoronediamine, tetrahydrodicyclopentadienylene diamine, hexahydro-4,7-methanoindanylenedimethylenediamine, tricycle[6.2.1.0$^{2.7}$]-undecylenedimethyldiamine and 4,4'-methylenebis(cyclohexylamine); diamines having two primary amino groups and a nitrogen atom other than the primary amino group in the molecule, such as 2,3-diaminopyridine, 2,6-diaminopyridine, 3,4-diaminopyridine, 2,4-diaminopyrimidine, 5,6-diamino-2,3-dicyanopyrazine, 5,6-diamino-2,4-dihydroxypyrimidine, 2,4-diamino-6-dimethylamino-1,3,5-triazine, 1,4-bis(3-aminopropyl)piperazine, 2,4-diamino-6-isopropoxy-1,3,5-triazine, 2,4-diamino-6-methoxy-1,3,5-triazine, 2,4-diamino-6-phenyl-1,3,5-triazine, 2,4-diamino-6-methyl-s-triazine, 2,4-diamino-1,3,5-triazine, 4,6-diamino-2-vinyl-s-triazine, 2,4-diamino-5-phenylthiazole, 2,6-diaminopurine, 5,6-diamino-1,3-dimethyluracil, 3,5-diamino-1,2,4-triazole, 6,9-diamino-2-ethoxyacridine lactate, 3,8-diamino-6-phenylphenanthridine, 1,4-diaminopiperazine, 3,6-diaminoacridine, bis(4-aminophenyl)phenylamine and compounds represented by the following formulas (III) to (IV):

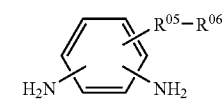
(III)

wherein $R^{05}$ is a divalent organic group, and $R^{06}$ is a monovalent organic group having a cyclic structure including a nitrogen atom selected from pyridine, pyrimidine, triazine, piperidine and piperazine,

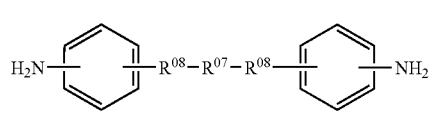
(IV)

wherein $R^{07}$ is a divalent organic group having a ring structure including a nitrogen atom selected from pyridine, pyrimidine, triazine, piperidine and piperazine, and $R^{08}$ is a divalent organic group, with the proviso that a plurality of $R^{08}$'s may be the same or different; a mono-substituted phenylenediamine represented by the following formula (V); diaminoorganosiloxanes represented by the following formula (VI):

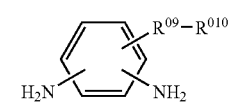
(V)

wherein $R^{09}$ is a divalent organic group selected from —O—, —COO—, —OCO—, —NHCO—, —CONH— and —CO—, and $R^{010}$ is an alkyl group having 6 to 30 carbon atoms,

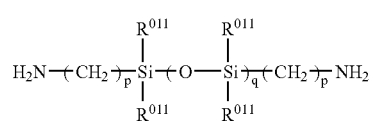
(VI)

wherein $R^{011}$ is a hydrocarbon group having 1 to 12 carbon atoms, with the proviso that a plurality of $R^{011}$'s may be the same or different, p is an integer of 1 to 3, and q is an integer of 1 to 20; and compounds represented by the following formulas (99) and (100).

These diamine compounds may be used alone or in combination of two or more.

(99)

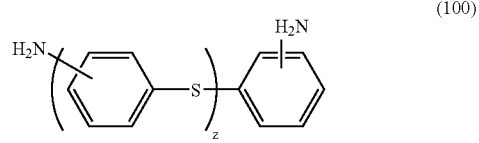
(100)

wherein y is an integer of 2 to 12, and z is an integer of 1 to 5.

Out of these, preferred are p-phenylenediamine, 4,4'-diaminodiphenylmethane, 4,4'-diaminodiphenylsulfide, 4,4'-diaminodiphenyl ether, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-cyclohexanediamine, 4,4'-methylenebis(cyclohexylamine), 1,4-bis(4-aminophenoxy)benzene, 2,6-diaminopyridine, 3,4-diaminopyridine, 2,4-diaminopyrimidine, 3,6-diaminoacridine, compounds represented by the following formula (101) out of the compounds represented by the above formula (III), compounds represented by the following formula (102) out of the compounds represented by the above formula (IV), and dodecanoxy-2,4-diaminobenzene, hexadecanoxy-2,4-diaminobenzene and octadecanoxy-2,4-diaminobenzene out of the compounds represented by the above formula (V). Particularly preferred are p-phenylenediamine, 4,4'-diaminodiphenylmethane, 4,4'-diaminodiphenyl ether, 1,4-cyclohexanediamine, dodecanoxy-2,4-diaminobenzene, hexadecanoxy-2,4-diaminobenzene and octadecanoxy-2,4-diaminobenzene.

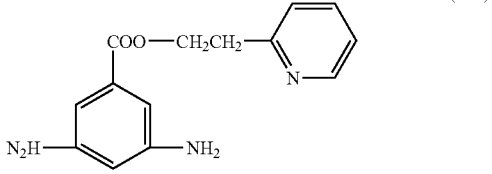
(101)

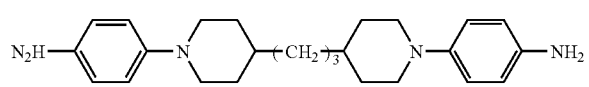
(102)

Synthesis of Polyamic Acid

As for the ratio of the tetracarboxylic dianhydride to the diamine used for the synthesis reaction of a polyamic acid, the amount of the acid anhydride group of the tetracarboxylic dianhydride is preferably 0.2 to 2 equivalents, more preferably 0.3 to 1.2 equivalents based on 1 equivalent of the amino group of the diamine.

The synthesis reaction of the polyamic acid is carried out in an organic solvent at a temperature of preferably −20 to 150° C., more preferably 0 to 100° C.

Any organic solvent is acceptable if it can dissolve the synthesized polyamic acid. Examples of the organic solvent include aprotic polar solvents such as 1-methyl-2-pyrrolidone, N,N-dimethylacetamide, N,N-dimethylformamide, dimethyl sulfoxide, γ-butyrolactone, tetramethylurea and hexamethylphosphoric triamide; and phenolic solvents such as m-cresol, xylenol, phenol and halogenated phenol. The amount (α) of the organic solvent is preferably such that the total amount (β) of the tetracarboxylic dianhydride and the diamine compound should be 0.1 to 30 wt % based on the total amount (α+β) of the reaction solution.

An alcohol, ketone, ester, ether, halogenated hydrocarbon or hydrocarbon which is a poor solvent for the polyamic acid may be used in conjunction with the above organic solvent in limits that the formed polyamic acid does not separate out. Specific examples of the poor solvent include methyl alcohol, ethyl alcohol, isopropyl alcohol, cyclohexanol, 4-hydroxy-4-methyl-2-pentanone, ethylene glycol, propylene glycol, 1,4-butanediol, triethylene glycol, ethylene glycol monomethyl ether, ethyl lactate, butyl lactate, acetone, methyl ethyl ketone, methyl isobutyl ketone, cyclohexanone, methyl acetate, ethyl acetate, butyl acetate, methyl methoxy propionate, ethyl ethoxy propionate, diethyl oxalate, diethyl malonate, diethyl ether, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, tetrahydrofuran, dichloromethane, 1,2-dichloroethane, 1,4-dichlorobutane, trichloroethane, chlorobenzene, o-dichlorobenzene, hexane, heptane, octane, benzene, toluene and xylene.

The reaction solution of the polyamic acid is thus obtained. This reaction solution is poured into a large amount of the poor solvent to obtain a precipitate which is then dried under reduced pressure to obtain a polyamic acid. This step of dissolving a polyamic acid in an organic solvent and precipitating a polyamic acid with a poor solvent is carried out once or a plurality of times to purify the polyamic acid.

Synthesis of Imidized Polymer

The imidized polymer forming the liquid crystal aligning agent of the present invention can be synthesized by dehydrating and ring-closing the above polyamic acid. The dehydration and ring-closure of the polyamic acid are carried out by (i) heating a polyamic acid or by (II) dissolving the polyamic acid in an organic solvent and adding a dehydrator and a dehydrating/ring-closing catalyst to this solution and optionally heating the obtained solution.

The reaction temperature in the method (i) for heating the polyamic acid is preferably 50 to 200° C., more preferably 60 to 170° C. When the reaction temperature is lower than 50° C., the dehydration/ring-closing reaction does not proceed fully and when the reaction temperature is higher than 200° C., the molecular weight of the obtained imidized polymer may lower.

In the method (II) for adding a dehydrator and a dehydrating/ring-closing catalyst to the polyamic acid solution, an acid anhydride such as acetic anhydride, propionic anhydride or trifluoroacetic anhydride may be used as the dehydrator. The amount of the dehydrator which depends on a desired imidization rate is preferably 0.01 to 20 mols based on 1 mol of the recurring unit of the polyamic acid. A tertiary amine such as pyridine, collidine, lutidine or triethylamine may be used as the dehydrating/ring-closing catalyst. However, the catalyst is not limited to these. The amount of the dehydrating/ring-closing catalyst is preferably 0.01 to 10 mols based on 1 mol of the dehydrator used. The imidization rate can be improved by increasing the amounts of the dehydrator and the dehydrating/ring-closing catalyst. The imidization rate is preferably 40% or more from the viewpoint of the after-image erase speed of a liquid crystal display element. Examples of the organic solvent used in the dehydration/ring-closure reaction are the same as the above examples used for the synthesis of the polyamic acid. The temperature of the dehydration/ring-closure reaction is preferably 0 to 180° C., more preferably 10 to 150° C. The same operation as in the method of purifying a polyamic acid is carried out on the reaction solution thus obtained to purify the imidized polymer.

Terminal Modified Polymer

The polyamic acid and the imidized polymer used in the present invention may be terminal modified polymers whose molecular weights have been adjusted. By using these terminal modified polymers, the coating properties of the liquid crystal aligning agent can be improved without impairing the effect of the present invention. The terminal modified polymers may be synthesized by adding an acid monoanhydride, monoamine compound or monoisocyanate compound to the reaction system when the polyamic acid is to be synthesized. Examples of the acid monoanhydride include maleic anhydride, phthalic anhydride, itaconic anhydride, n-decylsuccinic anhydride, n-dodecylsuccinic anhydride, n-tetradecylsuccinic anhydride and n-hexadecylsuccinic anhydride. Examples of the monoamine compound include aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine and n-eicosylamine. Examples of the monoisocyanate compound include phenyl isocyanate and naphthyl isocyanate.

Inherent Viscosity of Polymer

The polyamic acid and the imidized polymer thus obtained have an inherent viscosity ($\eta_{ln}$) of preferably 0.05 to 10 dl/g, more preferably 0.05 to 5 dl/g.

The inherent viscosity ($\eta_{ln}$) in the present invention is obtained from the following expression (i) by measuring the viscosity of an N-methyl-2-pyrrolidone solution having a concentration of 0.5 g/100 mml at 30° C.

$$\eta_{ln} = \frac{ln \text{ (Solution flow time/solvent flow time)}}{\text{Weight concentration of polymer}}$$

Liquid Crystal Aligning Agent

The liquid crystal aligning agent of the present invention contains the above polyamic acid and/or imidized polymer dissolved in an organic solvent.

The temperature for preparing the liquid crystal aligning agent of the present invention is preferably 0 to 200° C., more preferably 20 to 60° C.

Examples of the organic solvent forming the liquid crystal aligning agent of the present invention include 1-methyl-2-pyrrolidone, γ-butyrolactone, γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxy propionate, ethyl ethoxy propionate, ethylene glycol methyl ether, ethylene glycol ethyl ether, ethylene glycol-n-propyl ether, ethylene glycol-i-propyl ether, ethylene glycol-n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate and diethylene glycol monoethyl ether acetate.

The solid content of the liquid crystal aligning agent of the present invention which is selected in consideration of viscosity and volatility is preferably 1 to 10 wt %. That is, the liquid crystal aligning agent of the present invention is applied to the surface of a substrate to form a coating film which is a liquid crystal alignment film. When the solid content of the liquid crystal aligning agent is lower than 1 wt %, the thickness of this coating film becomes too small, thereby making it impossible to obtain a satisfactory liquid crystal alignment film. When the solid content is higher than 10 wt %, the thickness of the coating film becomes too large, also making it impossible to obtain a satisfactory liquid crystal alignment film and the viscosity of the liquid crystal aligning agent becomes too high, resulting in deteriorated coating properties.

The liquid crystal aligning agent of the present invention may contain a functional silane-containing compound and an epoxy compound in limits that do not impair the targeted physical properties in order to improve adhesion to the surface of the substrate. Examples of the functional silane-containing compound include 3-aminopropyltrimethoxysilane,
3-aminopropyltriethoxysilane,
2-aminopropyltrimethoxysilane,
2-aminopropyltriethoxysilane,
N-(2-aminoethyl)-3-aminopropyltrimethoxysilane,
N-(2-aminoethyl)-3-aminopropylmethyldimethoxysilane,
3-ureidopropyltrimethoxysilane,
3-ureidopropyltriethoxysilane,
N-ethoxycarbonyl-3-aminopropyltrimethoxysilane,
N-ethoxycarbonyl-3-aminopropyltriethoxysilane,
N-triethoxysilylpropyltriethylenetriamine,
N-trimethoxysilylpropyltriethylenetriamine,
10-trimethoxysilyl-1,4,7-triazadecane,
10-triethoxysilyl-1,4,7-triazadecane,
9-trimethoxysilyl-3,6-diazanonylacetate,
9-triethoxysilyl-3,6-diazanonylacetate,
N-benzyl-3-aminopropyltrimethoxysilane,
N-benzyl-3-aminopropyltriethoxysilane,
N-phenyl-3-aminopropyltrimethoxysilane,
N-phenyl-3-aminopropyltriethoxysilane,
N-bis(oxyethylene)-3-aminopropyltrimethoxysilane and
N-bis(oxyethylene)-3-aminopropyltriethoxysilane.

Examples of the epoxy compound include ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromoneopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, 3-(N-allyl-N-glycidyl)aminopropyltrimethoxysilane and 3-(N,N-diglycidyl)aminopropyltrimethoxysilane.

Liquid Crystal Display Element

The liquid crystal display element can be produced by the following method, for example.

(1) The liquid crystal aligning agent of the present invention is applied to one side of a substrate having a patterned transparent conductive film by roll coating, spinner coating or printing and heated to form a coating film.

The substrate is, for example, a transparent substrate made from glass such as float glass or soda glass, or a plastic film of polyethylene terephthalate, polybutylene terephthalate, polyether sulfone or polycarbonate. The transparent conductive film formed on one side of the substrate is, for example, a NESA film (trademark registered by PPG of the US) of $SnO_2$ or an ITO film of $In_2O_3$—$SnO_2$. A photo-etching technique or masking technique is used for the patterning of the transparent conductive film. Before the application of the liquid crystal aligning agent, to further improve adhesion between the substrate/transparent conductive film and the coating film, a functional silane-containing compound or functional titanium-containing compound may be applied to the surface of the substrate. The heating temperature after the application of the liquid crystal aligning agent is 80 to 300° C., preferably 120 to 250° C. A coating alignment film is formed by removing the organic solvent after the application of the liquid crystal aligning agent containing the polyamic acid of the present invention. The coating film may be changed into an imidized coating film by promoting dehydration/ring-closure by further heating. The thickness of the formed coating film is preferably 0.001 to 1 μm, more preferably 0.005 to 0.5 μm.

(2) The formed coating film side is rubbed in a certain direction with a roll wound with nylon, rayon or cotton fiber cloth. Thereby, the alignability of liquid crystal molecules is provided to the coating film to become a liquid crystal alignment film.

The visibility of the liquid crystal display element can be improved by carrying out a treatment for changing the pretilt angle by partially illuminating a liquid crystal alignment film formed from the liquid crystal aligning agent of the present invention with ultraviolet radiation as disclosed by JP-A 6-222366 or JP-A 6-281937 (the term "JP-A" as used herein means an "unexamined published Japanese patent application"), or a treatment for changing the liquid crystal alignability of the liquid crystal alignment film by partially forming a resist film on the rubbed surface of the liquid crystal alignment film, rubbing the liquid crystal alignment film in a direction different from the above rubbing direction and removing the resist film as disclosed by JP-A 5-107544.

(3) One substrate having the liquid crystal alignment film formed as described above and one substrate having a transparent conductive film which is not patterned are prepared and opposed to each other with a space (cell gap) therebetween in such a manner that the rubbing directions of the liquid crystal alignment films become perpendicular to each other or parallel to each other and opposite to each other, the peripheral portions of the two substrates are joined together with a sealing agent, liquid crystals are filled into the cell gap defined by the surfaces of the substrates and the sealing agent, and an injection hole is sealed up to form a liquid crystal cell. A polarizer is affixed to the exterior sides of the liquid crystal cell, that is, the other sides of the substrates forming the liquid crystal cell in such a manner that its polarization direction becomes the same or perpendicular to the rubbing direction of the liquid crystal alignment film formed on one side of the substrate to obtain a liquid crystal display element.

As the sealing agent may be used an epoxy resin containing a curing agent and aluminum oxide spheres as spacers.

The liquid crystals are nematic liquid crystals or smectic liquid crystals and preferably nematic liquid crystals such as Schiff base liquid crystals, azoxy-based liquid crystals, biphenyl-based liquid crystals, phenylcyclohexane-based liquid crystals, ester-based liquid crystals, terphenyl-based liquid crystals, biphenylcyclohexane-based liquid crystals, pyrimidine-based liquid crystals, dioxane-based liquid crystals, bicyclooctane-based liquid crystals or cubane-based liquid crystals. To the above liquid crystals may be added cholesteric liquid crystals such as cholestyl chloride, cholesteryl nonanoate or cholesteryl carbonate, or a chiral agent marketed under the trade name of C-15 or CB-15 (of Merck Co., Ltd.) before use. Further, ferroelectric liquid crystals such as p-decyloxybenzylidene-p-amino-2-methylbutyl cinnamate may also be used.

The polarizer affixed to the exterior sides of the liquid crystal cell is manufactured by sandwiching a polarizing film called "H film" which absorbs iodine between cellulose acetate protective films while polyvinyl alcohol is stretched and aligned, or the H film itself.

EXAMPLES

The following examples are provided for the purpose of further illustrating the present invention but are in no way to be taken as limiting. The evaluation methods of liquid crystal display elements manufactured in the following Examples and Comparative Examples are shown below.

Imidization Rate of Polymer and Average Imidization Rate of Liquid Crystal Aligning Agent After the polymer or the liquid crystal aligning agent was dried under reduced pressure at room temperature, it was dissolved in deuterated dimethyl sulfoxide and measured by $^1$H-NMR at room temperature using tetramethylsilane as a reference substance to obtain its imidization rate from the following equation (II). The imidization rate of a polyamic acid which was not subjected to a dehydration/ring-closure reaction was 0%.

$$\text{Imidization rate (\%)} = (1 - A^1/A^2 \times \alpha) \times 100 \quad \text{(II)}$$

$A^1$: peak area derived from the proton of NH group (10 ppm)

$A^2$: peak area derived from other proton

α: proportion of the number of other protons to 1 proton of NH group in the precursor (polyamic acid) of the polymer Residual DC Voltage of Liquid Crystal Display Element Right after 30 Hz 3.0 V rectangular waves superimposed by a DC of 1.0 V were applied to the liquid crystal display element at an ambient temperature of 70° C. for 1 hour and DC voltage was cut, the residual DC voltage in the liquid crystal cell was obtained by a flicker erase method.

After-image Erase Time of Liquid Crystal Display Element

After 30 Hz 3.0 V rectangular waves superimposed by a DC of 3.0 V and an AC of 6.0 V (peak-peak) were applied to the liquid crystal display element at an ambient temperature of 70° C. for 20 hours, the voltage was turned off to measure a time elapsed before an after-image disappeared visually.

Reliability Test of Liquid Crystal Display Element 1,500 hours after the liquid crystal display element was driven with 60 Hz 5V rectangular waves under a high-temperature and high-humidity environment (temperature of 70° C., relative humidity of 80%), the existence of a white stain-like surface defect was checked by observation through a polarization microscope.

Rubbing Resistance of Liquid Crystal Alignment Film

The liquid crystal aligning agent was applied to a substrate having an ITO film with a thickness of 1,500 Å, baked and rubbed 30 times with a rubbing roll at a revolution of 1,000 rpm, a stage moving rate of 70 mm/sec and a hair push-in length of 0.5 mm to check the existence of a scratched surface or peeled surface by observation through an optical microscope. When there was no scratched surface or peeled surface, the rubbing resistance of the liquid crystal alignment film was evaluated as "excellent".

Pretilt Angle Stability of Liquid Crystal Display Element

A liquid crystal display element which was aligned in an anti-parallel manner (two substrates were assembled together such that their liquid crystal alignment directions became opposite to each other and parallel to each other) was manufactured, maintained at room temperature for 24 hours or at 120° C. for 24 hours and measured for its pretilt angle. A value obtained by subtracting a pretilt angle when the element was maintained at 120° C. from a pretilt angle when the element was maintained at room temperature was measured as a reduction in pretilt angle. As the reduction in pretilt angle becomes smaller, the pretilt angle stability improves. The pretilt angle was measured by a crystal rotation method.

Light Resistance/Heat Resistance of Liquid Crystal Alignment Film

The liquid crystal aligning agent of the present invention was applied to one side of a substrate having a patterned transparent conductive film, 5,000 hours of an illumination test was made on the obtained coating film with a weather-ometer comprising a carbon arc as a light source, a liquid crystal display element was manufactured by using two of the above substrates, and the voltage retention of the liquid crystal display element was measured to calculate a light resistance/heat, resistance effect coefficient from the measurement value of voltage retention of the liquid crystal display element manufactured by the above procedure except that the illumination test was not carried out based on the following expression.

Light resistance/heat resistance effect coefficient=100−{(voltage retention of liquid crystal display element without an illumination test−voltage retention of liquid crystal display element after an illumination test)/voltage retention of liquid crystal display element without an illumination test}×100

Synthesis Examples 1 to 210 and Comparative Synthesis Examples 1 to 3

A diamine and a tetracarboxylic dianhydride (expressed as "acid anhydride" in the tables) were added to N-methyl-2-pyrrolidone in the order named in a ratio shown in Tables 1 to 12 to prepare a solution having a solid content of 15 wt % and reacted at 60° C. for 6 hours to obtain a polyamic acid having an inherent viscosity shown in Tables 1 to 12. Pyridine and acetic anhydride were added to the obtained polyamic acid in amounts 5 times and 3 times the molar amount of the total amount of the polyamic acid, respectively, and heated at 110° C. to carry out a dehydration/ring-closure reaction for 4 hours. The obtained solution was re-precipitated with diethyl ether, collected and dried to obtain imidized polymers B1 to B210 and b1 to b3 having an inherent viscosity and an imidization rate shown in Tables 1 to 12.

The diamine compounds and the tetracarboxylic dianhydrides shown in Tables 1 to 14 below are given below.

<Diamine Compounds>
D-1: 1,5-diaminonaphthalene
D-2: 2,2'-dimethyl-4,4'-diaminobiphenyl
D-3: p-phenylenediamine
D-4: 2,7-diaminofluorene
D-5: 1,8-diaminonaphthalene
D-6: 2,2'-ditrifluoromethyl-4,4'-diaminobiphenyl
D-7: 3,3'-dimethyl-4,4'-diaminobiphenyl
D-8: 2,7-diaminofluorenone
D-9: diamine represented by the above formula (6-1)
D-10: diamine represented by the above formula (10-1)
D-11: diamine represented by the above formula (22)
D-12: diamine represented by the above formula (32)
D-13: diamine represented by the above formula (34)
D-14: diamine represented by the above formula (40)
D-15: diamine represented by the above formula (33)
D-16: 4,4'-methylenedianiline
D-17: diamine represented by the above formula (23)
D-18: diamine represented by the above formula (37)
D-19: diamine represented by the above formula (26)
D-20: diamine represented by the above formula (42)
D-21: diamine represented by the above formula (43)
D-22: diamine represented by the above formula (44)
D-23: diamine represented by the above formula (45)
D-24: diamine represented by the above formula (46)
D-25: diamine represented by the above formula (47)
D-26: diamine represented by the above formula (48)
D-27: diamine represented by the above formula (49)
D-28: diamine represented by the above formula (50)
D-29: diamine represented by the above formula (51)
D-30: diamine represented by the above formula (52)
D-31: diamine represented by the above formula (53)
D-32: diamine represented by the above formula (54)
D-33: diamine represented by the above formula (55)
D-34: diamine represented by the above formula (56)
D-35: diamine represented by the above formula (57)
D-36: diamine represented by the above formula (58)
D-37: diamine represented by the above formula (59)
D-38: diamine represented by the above formula (60)
D-39: diamine represented by the above formula (61)
D-40: diamine represented by the above formula (62)
D-41: diamine represented by the above formula (63)
D-42: diamine represented by the above formula (64)
D-43: diamine represented by the above formula (65)
D-44: diamine represented by the above formula (66)
D-45: diamine represented by the above formula (67)
D-46: diamine represented by the above formula (68)
D-47: diamine represented by the above formula (69)
D-48: diamine represented by the above formula (70)
D-49: diamine represented by the above formula (71)
D-50: diamine represented by the above formula (72)
D-51: diamine represented by the above formula (73)
D-52: diamine represented by the above formula (74)
D-53: diamine represented by the above formula (75)
D-54: diamine represented by the above formula (76)
D-55: diamine represented by the above formula (77)
D-56: diamine represented by the above formula (78)
D-57: diamine represented by the above formula (79)
D-58: diamine represented by the above formula (80)
D-59: diamine represented by the above formula (81)
D-60: diamine represented by the above formula (82)

D-61: diamine represented by the above formula (83)
D-62: diamine represented by the above formula (84)
D-63: diamine represented by the above formula (85)
D-64: diamine represented by the above formula (86)
D-65: diamine represented by the above formula (87)
D-66: diamine represented by the above formula (88)
D-67: diamine represented by the above formula (89)
D-68: diamine represented by the above formula (90)
D-69: diamine represented by the above formula (91)
D-70: diamine represented by the above formula (92)
D-71: diamine represented by the above formula (93)
D-72: diamine represented by the above formula (94)
D-73: diamine represented by the above formula (95)
D-74: diamine represented by the above formula (96)
D-75: diamine represented by the above formula (97)
D-76: diamine represented by the above formula (98)

<Tetracarboxylic Dianhydrides>

T-1: 2,3,5-tricarboxycyclopentylacetic dianhydride
T-2: 3-oxabicyclo[3.2.1]octane-2,4-dione-6-spiro-3'-(tetrahydrofuran-2',5'-dione)
T-3: pyromellitic dianhydride
T-4: (4arH,8arH)-decahydro-1t,4t:5c,8c-dimethanonaphthalene-2t,3t,6c,7c-tetracarboxylic dianhydride

TABLE 1

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 1 | D-1(40), D-11(10) | T-1(50) | 0.7 | 98 | 0.7 | B1 |
| 2 | D-1(45), D-12(5) | T-1(50) | 0.7 | 96 | 0.6 | B2 |
| 3 | D-2(49), D-12(1) | T-1(50) | 0.8 | 95 | 0.7 | B3 |
| 4 | D-2(48), D-12(2) | T-1(50) | 0.9 | 97 | 0.9 | B4 |
| 5 | D-2(45), D-12(5) | T-1(50) | 0.9 | 95 | 0.8 | B5 |
| 6 | D-2(44), D-13(6) | T-1(50) | 0.9 | 99 | 0.8 | B6 |
| 7 | D-2(48.5), D-12(1.5) | T-1(50) | 0.8 | 97 | 0.7 | B7 |
| 8 | D-2(45.5), D-13(4.5) | T-1(50) | 0.8 | 96 | 0.6 | B8 |
| 9 | D-1(46), D-4(2), D-12(2) | T-1(50) | 0.9 | 97 | 0.8 | B9 |
| 10 | D-6(49.5), D-12(0.5) | T-1(50) | 0.5 | 96 | 0.5 | B10 |
| 11 | D-2(24), D-3(24), D-12(2) | T-1(50) | 1 | 98 | 0.9 | B11 |
| 12 | D-2(22), D-3(22), D-13(6) | T-1(50) | 1 | 98 | 0.9 | B12 |
| 13 | D-2(24), D-3(24), D-12(2) | T-1(50) | 0.8 | 98 | 0.8 | B13 |
| 14 | D-2(47.5), D-12(2.5) | T-1(50) | 0.7 | 94 | 0.7 | B14 |
| 15 | D-3(24), D-6(24), D-11(2) | T-1(50) | 0.7 | 96 | 0.6 | B15 |
| 16 | D-2(45), D-14(5) | T-1(50) | 0.9 | 99 | 0.8 | B16 |
| 17 | D-7(45), D-11(5) | T-1(50) | 1.1 | 99 | 0.9 | B17 |
| 18 | D-6(20), D-7(20), D-13(10) | T-1(50) | 0.8 | 97 | 0.7 | B18 |
| 19 | D-8(45), D-11(5) | T-1(50) | 0.8 | 98 | 0.8 | B19 |
| 20 | D-3(24), D-7(24), D-12(2) | T-1(50) | 0.9 | 96 | 0.7 | B20 |

TABLE 2

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 21 | D-2(47), D-13(3) | T-1(50) | 0.8 | 95 | 0.6 | B21 |
| 22 | D-2(48.5), D-13(1.5) | T-1(50) | 0.8 | 97 | 0.7 | B22 |
| 23 | D-2(39), D-12(10), D-8(1) | T-1(50) | 0.9 | 97 | 0.8 | B23 |
| 24 | D-1(24), D-2(24), D-15(2) | T-1(50) | 0.7 | 94 | 0.7 | B24 |
| 25 | D-1(24), D-3(24), D-15(2) | T-1(50) | 0.9 | 96 | 0.6 | B25 |
| 26 | D-5(48), D-12(2) | T-1(50) | 0.8 | 98 | 0.7 | B26 |
| 27 | D-9(48), D-11(2) | T-1(50) | 0.8 | 95 | 0.7 | B27 |
| 28 | D-10(48), D-11(2) | T-1(50) | 0.6 | 97 | 0.5 | B28 |
| 29 | D-8(48), D-12(2) | T-1(50) | 0.9 | 94 | 0.8 | B29 |
| 30 | D-7(24), D-8(24), D-12(2) | T-1(50) | 0.8 | 93 | 0.6 | B30 |
| 31 | D-1(40), D-11(10) | T-1(25), T-2(25) | 1 | 96 | 0.9 | B31 |
| 32 | D-1(45), D-12(5) | T-1(25), T-2(25) | 1.1 | 96 | 0.9 | B32 |
| 33 | D-1(48), D-13(2) | T-1(25), T-2(25) | 0.8 | 97 | 0.7 | B33 |
| 34 | D-2(45), D-11(5) | T-1(25), T-2(25) | 0.9 | 99 | 0.8 | B34 |
| 35 | D-2(45), D-12(5) | T-1(25), T-2(25) | 0.7 | 100 | 0.6 | B35 |

TABLE 3

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 36 | D-2(24), D-4(24), D-12(2) | T-1(25), T-2(25) | 0.6 | 98 | 0.6 | B36 |
| 37 | D-3(24), D-4(24), D-12(2) | T-1(25), T-2(25) | 0.8 | 95 | 0.6 | B37 |
| 38 | D-1(45), D-13(5) | T-1(25), T-2(25) | 0.7 | 98 | 0.5 | B38 |
| 39 | D-1(46), D-4(2), D-12(2) | T-1(25), T-2(25) | 0.7 | 94 | 0.6 | B39 |
| 40 | D-7(48), D-12(2) | T-1(25), T-2(25) | 0.8 | 97 | 0.7 | B40 |
| 41 | D-2(24), D-3(24), D-12(2) | T-1(25), T-2(25) | 0.9 | 96 | 0.7 | B41 |
| 42 | D-5(40), D-11(10) | T-1(25), T-2(25) | 0.6 | 97 | 0.5 | B42 |
| 43 | D-1(24), D-3(24), D-12(2) | T-1(25), T-2(25) | 0.7 | 98 | 0.6 | B43 |
| 44 | D-6(45), D-11(5) | T-1(25), T-2(25) | 1.1 | 98 | 0.9 | B44 |
| 45 | D-3(24), D-6(24), D-11(2) | T-1(25), T-2(25) | 0.8 | 97 | 0.6 | B45 |
| 46 | D-2(45), D-14(5) | T-1(25), T-2(25) | 0.9 | 95 | 0.7 | B46 |
| 47 | D-7(45), D-11(5) | T-1(25), T-2(25) | 0.9 | 96 | 0.7 | B47 |
| 48 | D-6(20), D-7(20), D-13(10) | T-1(25), T-2(25) | 0.7 | 99 | 0.6 | B48 |

TABLE 4

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 49 | D-8(45), D-11(5) | T-1(25), T-2(25) | 0.7 | 97 | 0.6 | B49 |
| 50 | D-3(24), D-7(24), D-12(2) | T-1(25), T-2(25) | 0.9 | 98 | 0.7 | B50 |
| 51 | D-1(48), D-15(2) | T-1(25), T-2(25) | 0.8 | 99 | 0.6 | B51 |
| 52 | D-2(48), D-15(2) | T-1(25), T-2(25) | 0.6 | 98 | 0.5 | B52 |
| 53 | D-4(48), D-12(2) | T-1(25), T-2(25) | 0.7 | 100 | 0.5 | B53 |
| 54 | D-1(24), D-2(24), D-15(2) | T-1(25), T-2(25) | 1 | 98 | 0.8 | B54 |
| 55 | D-1(24), D-3(24), D-15(2) | T-1(25), T-2(25) | 1 | 98 | 0.8 | B55 |
| 56 | D-5(48), D-12(2) | T-1(25), T-2(25) | 0.7 | 97 | 0.5 | B56 |
| 57 | D-9(48), D-11(2) | T-1(25), T-2(25) | 0.8 | 95 | 0.6 | B57 |
| 58 | D-10(48), D-11(2) | T-1(25), T-2(25) | 0.9 | 97 | 0.7 | B58 |
| 59 | D-8(48), D-12(2) | T-1(25), T-2(25) | 0.6 | 98 | 0.6 | B59 |
| 60 | D-7(24), D-8(24), D-12(2) | T-1(25), T-4(25) | 0.7 | 97 | 0.6 | B60 |
| 61 | D-1(40), D-11(10) | T-1(25), T-4(25) | 0.8 | 96 | 0.8 | B61 |
| 62 | D-1(45), D-12(5) | T-1(25), T-4(25) | 0.7 | 100 | 0.6 | B62 |
| 63 | D-1(48), D-13(2) | T-1(25), T-4(25) | 0.7 | 95 | 0.5 | B63 |
| 64 | D-2(45), D-11(5) | T-1(25), T-4(25) | 0.9 | 94 | 0.8 | B64 |
| 65 | D-2(45), D-12(5) | T-1(25), T-4(25) | 0.6 | 94 | 0.6 | B65 |

TABLE 5

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 66 | D-2(24), D-4(24), D-12(2) | T-1(25), T-4(25) | 0.8 | 97 | 0.8 | B66 |
| 67 | D-3(24), D-4(24), D-12(2) | T-1(25), T-4(25) | 0.7 | 95 | 0.7 | B67 |
| 68 | D-1(45), D-13(5) | T-1(25), T-4(25) | 1 | 94 | 0.9 | B68 |
| 69 | D-1(46), D-4(2), D-12(2) | T-1(25), T-4(25) | 0.8 | 96 | 0.7 | B69 |
| 70 | D-7(48), D-12(2) | T-1(25), T-4(25) | 0.7 | 97 | 0.6 | B70 |
| 71 | D-2(24), D-3(24), D-12(2) | T-1(25), T-4(25) | 0.7 | 97 | 0.6 | B71 |
| 72 | D-5(40), D-11(10) | T-1(25), T-4(25) | 0.7 | 99 | 0.5 | B72 |
| 73 | D-1(24), D-3(24), D-12(2) | T-1(25), T-4(25) | 0.6 | 100 | 0.5 | B73 |
| 74 | D-6(45), D-11(5) | T-1(25), T-4(25) | 0.8 | 94 | 0.7 | B74 |
| 75 | D-3(24), D-6(24), D-11(2) | T-1(25), T-4(25) | 0.6 | 98 | 0.6 | B75 |
| 76 | D-2(45), D-14(5) | T-1(25), T-4(25) | 0.7 | 96 | 0.7 | B76 |
| 77 | D-7(45), D-11(5) | T-1(25), T-4(25) | 0.9 | 97 | 0.8 | B77 |
| 78 | D-6(20), D-7(20), D-13(10) | T-1(25), T-4(25) | 0.6 | 99 | 0.6 | B78 |

TABLE 6

| Synthetic Example | Diamine compound (mmol) | Acid anhydride (mmol) | Inherent viscosity of polyamic acid (dl/g) | Imidization rate (%) | Inherent viscosity (dl/g) | Polymer |
|---|---|---|---|---|---|---|
| 79 | D-8(45), D-11(5) | T-1(25), T-4(25) | 0.6 | 97 | 0.5 | B79 |
| 80 | D-3(24), D-7(24), D-12(2) | T-1(25), T-4(25) | 0.8 | 95 | 0.6 | B80 |
| 81 | D-1(48), D-15(2) | T-1(25), T-4(25) | 0.7 | 98 | 0.7 | B81 |
| 82 | D-2(48), D-15(2) | T-1(25), T-4(25) | 0.7 | 97 | 0.7 | B82 |
| 83 | D-4(48), D-12(2) | T-1(25), T-4(25) | 0.9 | 98 | 0.7 | B83 |
| 84 | D-1(24), D-2(24), D-15(2) | T-1(25), T-4(25) | 0.5 | 98 | 0.4 | B84 |
| 85 | D-1(24), D-3(24), D-15(2) | T-1(25), T-4(25) | 0.7 | 99 | 0.7 | B85 |
| 86 | D-5(48), D-12(2) | T-1(25), T-4(25) | 0.9 | 97 | 0.8 | B86 |
| 87 | D-9(48), D-11(2) | T-1(25), T-4(25) | 0.8 | 98 | 0.7 | B87 |
| 88 | D-10(48), D-11(2) | T-1(25), T-4(25) | 0.8 | 97 | 0.6 | B88 |
| 89 | D-8(48), D-12(2) | T-1(25), T-4(25) | 0.7 | 97 | 0.5 | B89 |
| 90 | D-7(24), D-8(24), D-12(2) | T-1(25), T-4(25) | 1 | 99 | 0.8 | B90 |
| 91 | D-2(45), D-17(5) | T-1(50) | 0.7 | 95 | 0.6 | B91 |
| 92 | D-2(45), D-18(5) | T-1(50) | 0.9 | 98 | 0.5 | B92 |
| 93 | D-2(45), D-19(5) | T-1(50) | 0.6 | 96 | 0.5 | B93 |
| 94 | D-2(45), D-20(5) | T-1(50) | 0.8 | 97 | 0.6 | B94 |
| 95 | D-2(45), D-21(5) | T-1(50) | 0.7 | 98 | 0.5 | B95 |

TABLE 7

| Synthetic Example | Diamine compound (mmol) | Acid anhydride (mmol) | Inherent viscosity of polyamic acid (dl/g) | Imidization rate (%) | Inherent viscosity (dl/g) | Polymer |
|---|---|---|---|---|---|---|
| 96 | D-2(45), D-22(5) | T-1(50) | 0.9 | 94 | 0.8 | B96 |
| 97 | D-2(45), D-23(5) | T-1(50) | 0.9 | 96 | 0.7 | B97 |
| 98 | D-2(45), D-24(5) | T-1(50) | 0.7 | 95 | 0.5 | B98 |
| 99 | D-2(45), D-25(5) | T-1(50) | 0.8 | 97 | 0.9 | B99 |
| 100 | D-2(45), D-26(5) | T-1(50) | 1.1 | 97 | 0.7 | B100 |
| 101 | D-2(45), D-27(5) | T-1(50) | 0.5 | 94 | 0.5 | B101 |
| 102 | D-2(45), D-28(5) | T-1(50) | 0.8 | 96 | 0.5 | B102 |
| 103 | D-2(45), D-29(5) | T-1(50) | 0.7 | 95 | 0.5 | B103 |
| 104 | D-2(45), D-30(5) | T-1(50) | 0.7 | 97 | 0.6 | B104 |
| 105 | D-2(45), D-31(5) | T-1(50) | 0.9 | 97 | 0.7 | B105 |
| 106 | D-2(45), D-32(5) | T-1(50) | 0.7 | 95 | 0.5 | B106 |
| 107 | D-2(45), D-33(5) | T-1(50) | 0.8 | 96 | 0.6 | B107 |
| 108 | D-2(45), D-34(5) | T-1(50) | 0.7 | 95 | 0.5 | B108 |
| 109 | D-2(45), D-35(5) | T-1(50) | 0.9 | 97 | 0.6 | B109 |
| 110 | D-2(45), D-36(5) | T-1(50) | 0.9 | 99 | 0.8 | B110 |
| 111 | D-2(45), D-37(5) | T-1(50) | 0.8 | 95 | 0.5 | B111 |
| 112 | D-2(45), D-38(5) | T-1(50) | 1 | 93 | 0.7 | B112 |
| 113 | D-2(45), D-39(5) | T-1(50) | 0.9 | 98 | 0.7 | B113 |
| 114 | D-2(45), D-40(5) | T-1(50) | 0.8 | 96 | 0.5 | B114 |
| 115 | D-2(45), D-41(5) | T-1(50) | 0.7 | 96 | 0.5 | B115 |

TABLE 8

| Synthetic Example | Diamine compound (mmol) | Acid anhydride (mmol) | Inherent viscosity of polyamic acid (dl/g) | Imidization rate (%) | Inherent viscosity (dl/g) | Polymer |
|---|---|---|---|---|---|---|
| 116 | D-2(45), D-42(5) | T-1(50) | 0.8 | 98 | 0.7 | B116 |
| 117 | D-2(45), D-43(5) | T-1(50) | 0.6 | 94 | 0.4 | B117 |
| 118 | D-2(45), D-44(5) | T-1(50) | 0.7 | 96 | 0.6 | B118 |
| 119 | D-2(45), D-45(5) | T-1(50) | 0.9 | 98 | 0.8 | B119 |
| 120 | D-2(45), D-46(5) | T-1(50) | 0.8 | 96 | 0.5 | B120 |
| 121 | D-2(45), D-47(5) | T-1(50) | 0.7 | 95 | 0.6 | B121 |
| 122 | D-2(45), D-48(5) | T-1(50) | 0.7 | 95 | 0.7 | B122 |
| 123 | D-2(45), D-49(5) | T-1(50) | 0.9 | 98 | 0.5 | B123 |
| 124 | D-2(45), D-50(5) | T-1(50) | 0.6 | 94 | 0.5 | B124 |
| 125 | D-2(45), D-51(5) | T-1(50) | 0.8 | 93 | 0.7 | B125 |
| 126 | D-2(45), D-52(5) | T-1(50) | 0.7 | 98 | 0.5 | B126 |
| 127 | D-2(45), D-53(5) | T-1(50) | 0.6 | 97 | 0.6 | B127 |
| 128 | D-2(45), D-54(5) | T-1(50) | 0.9 | 95 | 0.8 | B128 |

TABLE 8-continued

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 129 | D-2(45), D-55(5) | T-1(50) | 0.6 | 96 | 0.6 | B129 |
| 130 | D-2(45), D-56(5) | T-1(50) | 0.8 | 97 | 0.5 | B130 |
| 131 | D-2(45), D-57(5) | T-1(50) | 1.1 | 97 | 1 | B131 |
| 132 | D-2(45), D-58(5) | T-1(50) | 1 | 95 | 0.8 | B132 |
| 133 | D-2(45), D-59(5) | T-1(50) | 1.2 | 99 | 1 | B133 |
| 134 | D-2(45), D-60(5) | T-1(50) | 0.8 | 94 | 0.4 | B134 |
| 135 | D-2(45), D-61(5) | T-1(50) | 0.8 | 97 | 0.7 | B135 |

TABLE 9

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 136 | D-2(45), D-62(5) | T-1(50) | 0.9 | 96 | 0.6 | B136 |
| 137 | D-2(45), D-63(5) | T-1(50) | 0.7 | 95 | 0.6 | B137 |
| 138 | D-2(45), D-64(5) | T-1(50) | 0.8 | 98 | 0.7 | B138 |
| 139 | D-2(45), D-65(5) | T-1(50) | 0.6 | 98 | 0.5 | B139 |
| 140 | D-2(45), D-66(5) | T-1(50) | 0.8 | 97 | 0.6 | B140 |
| 141 | D-2(45), D-67(5) | T-1(50) | 0.8 | 98 | 0.5 | B141 |
| 142 | D-2(45), D-68(5) | T-1(50) | 0.9 | 95 | 0.6 | B142 |
| 143 | D-2(45), D-69(5) | T-1(50) | 0.5 | 98 | 0.4 | B143 |
| 144 | D-2(45), D-70(5) | T-1(50) | 0.6 | 96 | 0.5 | B144 |
| 145 | D-2(45), D-71(5) | T-1(50) | 0.8 | 94 | 0.6 | B145 |
| 146 | D-2(45), D-72(5) | T-1(50) | 0.7 | 95 | 0.6 | B146 |
| 147 | D-2(45), D-73(5) | T-1(50) | 0.8 | 99 | 0.5 | B147 |
| 148 | D-2(45), D-74(5) | T-1(50) | 0.6 | 96 | 0.5 | B148 |
| 149 | D-2(45), D-75(5) | T-1(50) | 0.9 | 95 | 0.7 | B149 |
| 150 | D-2(45), D-76(5) | T-1(50) | 0.5 | 93 | 0.3 | B150 |
| 151 | D-9(45), D-17(5) | T-1(50) | 0.7 | 95 | 0.6 | B151 |
| 152 | D-9(45), D-18(5) | T-1(50) | 0.9 | 98 | 0.5 | B152 |
| 153 | D-9(45), D-19(5) | T-1(50) | 0.6 | 96 | 0.5 | B153 |
| 154 | D-9(45), D-20(5) | T-1(50) | 0.8 | 97 | 0.6 | B154 |
| 155 | D-9(45), D-21(5) | T-1(50) | 0.7 | 98 | 0.5 | B155 |

TABLE 10

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 156 | D-9(45), D-22(5) | T-1(50) | 0.9 | 94 | 0.8 | B156 |
| 157 | D-9(45), D-23(5) | T-1(50) | 0.9 | 96 | 0.7 | B157 |
| 158 | D-9(45), D-24(5) | T-1(50) | 0.7 | 95 | 0.5 | B158 |
| 159 | D-9(45), D-25(5) | T-1(50) | 0.8 | 97 | 0.9 | B159 |
| 160 | D-9(45), D-26(5) | T-1(50) | 1.1 | 97 | 0.7 | B160 |
| 161 | D-9(45), D-27(5) | T-1(50) | 0.5 | 94 | 0.5 | B161 |
| 162 | D-9(45), D-28(5) | T-1(50) | 0.8 | 96 | 0.5 | B162 |
| 163 | D-9(45), D-29(5) | T-1(50) | 0.7 | 95 | 0.5 | B163 |
| 164 | D-9(45), D-30(5) | T-1(50) | 0.7 | 97 | 0.6 | B164 |
| 165 | D-9(45), D-31(5) | T-1(50) | 0.9 | 97 | 0.7 | B165 |
| 166 | D-9(45), D-32(5) | T-1(50) | 0.7 | 95 | 0.5 | B166 |
| 167 | D-9(45), D-33(5) | T-1(50) | 0.8 | 96 | 0.6 | B167 |
| 168 | D-9(45), D-34(5) | T-1(50) | 0.7 | 95 | 0.5 | B168 |
| 169 | D-9(45), D-35(5) | T-1(50) | 0.9 | 97 | 0.6 | B169 |
| 170 | D-9(45), D-36(5) | T-1(50) | 0.9 | 99 | 0.8 | B170 |
| 171 | D-9(45), D-37(5) | T-1(50) | 0.8 | 95 | 0.5 | B171 |
| 172 | D-9(45), D-38(5) | T-1(50) | 1 | 93 | 0.7 | B172 |
| 173 | D-9(45), D-39(5) | T-1(50) | 0.9 | 98 | 0.7 | B173 |
| 174 | D-9(45), D-40(5) | T-1(50) | 0.8 | 96 | 0.5 | B174 |
| 175 | D-9(45), D-41(5) | T-1(50) | 0.7 | 96 | 0.5 | B175 |

TABLE 11

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 176 | D-9(45), D-42(5) | T-1(50) | 0.8 | 98 | 0.7 | B176 |
| 177 | D-9(45), D-43(5) | T-1(50) | 0.6 | 94 | 0.4 | B177 |
| 178 | D-9(45), D-44(5) | T-1(50) | 0.7 | 96 | 0.6 | B178 |
| 179 | D-9(45), D-45(5) | T-1(50) | 0.9 | 98 | 0.8 | B179 |
| 180 | D-9(45), D-46(5) | T-1(50) | 0.8 | 96 | 0.5 | B180 |
| 181 | D-9(45), D-47(5) | T-1(50) | 0.7 | 95 | 0.6 | B181 |
| 182 | D-9(45), D-48(5) | T-1(50) | 0.7 | 95 | 0.7 | B182 |
| 183 | D-9(45), D-49(5) | T-1(50) | 0.9 | 98 | 0.5 | B183 |
| 184 | D-9(45), D-50(5) | T-1(50) | 0.6 | 94 | 0.5 | B184 |
| 185 | D-9(45), D-51(5) | T-1(50) | 0.8 | 93 | 0.7 | B185 |
| 186 | D-9(45), D-52(5) | T-1(50) | 0.7 | 98 | 0.5 | B186 |
| 187 | D-9(45), D-53(5) | T-1(50) | 0.6 | 97 | 0.6 | B187 |
| 188 | D-9(45), D-54(5) | T-1(50) | 0.9 | 95 | 0.8 | B188 |
| 189 | D-9(45), D-55(5) | T-1(50) | 0.6 | 96 | 0.6 | B189 |
| 190 | D-9(45), D-56(5) | T-1(50) | 0.8 | 97 | 0.5 | B190 |
| 191 | D-9(45), D-57(5) | T-1(50) | 1.1 | 97 | 1 | B191 |
| 192 | D-9(45), D-58(5) | T-1(50) | 1 | 95 | 0.8 | B192 |
| 193 | D-9(45), D-59(5) | T-1(50) | 1.2 | 99 | 1 | B193 |
| 194 | D-9(45), D-60(5) | T-1(50) | 0.8 | 94 | 0.4 | B194 |
| 195 | D-9(45), D-61(5) | T-1(50) | 0.8 | 97 | 0.6 | B195 |

TABLE 12

| Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 196 | D-9(45), D-62(5) | T-1(50) | 0.9 | 96 | 0.6 | B196 |
| 197 | D-9(45), D-63(5) | T-1(50) | 0.7 | 95 | 0.6 | B197 |
| 198 | D-9(45), D-64(5) | T-1(50) | 0.8 | 98 | 0.7 | B198 |
| 199 | D-9(45), D-65(5) | T-1(50) | 0.6 | 99 | 0.6 | B199 |
| 200 | D-9(45), D-66(5) | T-1(50) | 0.8 | 97 | 0.6 | B200 |
| 201 | D-9(45), D-67(5) | T-1(50) | 0.8 | 98 | 0.5 | B201 |
| 202 | D-9(45), D-68(5) | T-1(50) | 0.9 | 95 | 0.6 | B202 |
| 203 | D-9(45), D-69(5) | T-1(50) | 0.5 | 98 | 0.4 | B203 |
| 204 | D-9(45), D-70(5) | T-1(50) | 0.6 | 96 | 0.5 | B204 |
| 205 | D-9(45), D-71(5) | T-1(50) | 0.8 | 94 | 0.6 | B205 |
| 206 | D-9(45), D-72(5) | T-1(50) | 0.7 | 95 | 0.6 | B206 |
| 207 | D-9(45), D-73(5) | T-1(50) | 0.8 | 99 | 0.7 | B207 |
| 208 | D-9(45), D-74(5) | T-1(50) | 0.6 | 98 | 0.5 | B208 |
| 209 | D-9(45), D-75(5) | T-1(50) | 0.9 | 94 | 0.7 | B209 |
| 210 | D-9(45), D-76(5) | T-1(50) | 0.5 | 93 | 0.3 | B210 |

| Comparative Synthetic Example | Diamine compound (mmol) | Acid anhydride (mmol) | Inherent viscosity of polyamic acid (dl/g) | Imidization rate (%) | Imidized polymer Inherent viscosity (dl/g) | Polymer |
|---|---|---|---|---|---|---|
| 1 | D-16(50) | T-1(50) | 1.0 | 95 | 0.9 | b1 |
| 2 | D-17(50) | T-1(25) T-4(25) | 1.2 | 96 | 1.1 | b2 |
| 3 | D-2(1), D-16(49) | T-1(50) | 0.9 | 94 | 0.9 | b3 |

Synthesis Examples 211 to 240 and Comparative Synthesis Example 4

A diamine and a tetracarboxylic dianhydride (expressed as "acid anhydride" in the tables) were added to N-methyl-2-pyrrolidone in the order named in a ratio shown in Tables 13 and 14 to prepare a solution having a solid content of 10 wt % and reacted at 25° C. for 6 hours to obtain polyamic acids A211 to A240 and a4 having an inherent viscosity shown in Tables 13 and 14.

TABLE 13

| Synthesis Example | Diamine compound (mmol) | Acid anhydride (mmol) | Inherent viscosity (dl/g) | Polymer |
|---|---|---|---|---|
| 211 | D-1(40), D-11(10) | T-3(50) | 1.1 | A211 |
| 212 | D-1(45), D-12(5) | T-3(50) | 0.7 | A212 |
| 213 | D-1(48), D-13(2) | T-3(50) | 0.9 | A213 |
| 214 | D-2(45), D-11(5) | T-3(50) | 1 | A214 |
| 215 | D-2(45), D-12(5) | T-3(50) | 1.1 | A215 |

TABLE 13-continued

| Synthesis Example | Diamine compound (mmol) | Acid anhydride (mmol) | Inherent viscosity (dl/g) | Polymer |
|---|---|---|---|---|
| 216 | D-2(24), D-4(24), D-12(2) | T-3(50) | 1 | A216 |
| 217 | D-3(24), D-4(24), D-12(2) | T-3(50) | 0.8 | A217 |
| 218 | D-1(45), D-13(5) | T-3(50) | 0.6 | A218 |
| 219 | D-1(46), D-4(2), D-12(2) | T-3(50) | 0.7 | A219 |
| 220 | D-7(48), D-12(2) | T-3(50) | 0.9 | A220 |
| 221 | D-2(24), D-3(24), D-12(2) | T-3(50) | 1 | A221 |
| 222 | D-5(40), D-11(10) | T-3(50) | 0.7 | A222 |
| 223 | D-1(24), D-3(24), D-12 (2) | T-3(50) | 0.7 | A223 |
| 224 | D-6(45), D-11(5) | T-3(50) | 0.8 | A224 |
| 225 | D-3(24), D-6(24), D-11(2) | T-3(50) | 0.9 | A225 |
| 226 | D-2(45), D-14(5) | T-3(50) | 0.6 | A226 |
| 227 | D-7(45), D-11(5) | T-3(50) | 0.7 | A227 |

TABLE 14

| Synthesis Example | Diamine compound (mmol) | Acid anhydride (mmol) | Inherent viscosity (dl/g) | Polymer |
|---|---|---|---|---|
| 228 | D-6(20), D-7(20), D-13(10) | T-3(50) | 0.6 | A228 |
| 229 | D-8(45), D-11(5) | T-3(50) | 0.8 | A229 |
| 230 | D-3(24), D-7(24), D-12(2) | T-3(50) | 1 | A230 |
| 231 | D-1(48), D-15(2) | T-3(50) | 0.8 | A231 |
| 232 | D-2(48), D-15(2) | T-3(50) | 0.7 | A232 |
| 233 | D-4(48), D-12(2) | T-3(50) | 0.8 | A233 |
| 234 | D-1(24), D-2(24), D-15(2) | T-3(50) | 0.9 | A234 |
| 235 | D-1(24), D-3(24), D-15(2) | T-3(50) | 1 | A235 |
| 236 | D-5(48), D-12(2) | T-3(50) | 0.8 | A236 |
| 237 | D-9(48), D-11(2) | T-3(50) | 0.7 | A237 |
| 238 | D-10(48), D-11(2) | T-3(50) | 0.7 | A238 |
| 239 | D-8(48), D-12(2) | T-3(50) | 0.8 | A239 |
| 240 | D-7(24), D-8(24), D-12(2) | T-3(50) | 0.8 | A240 |

| Comparative Synthesis Example | Diamine compound (mmol) | Acid anhydride (mmol) | Inherent viscosity (dl/g) | Polymer |
|---|---|---|---|---|
| 4 | D-16(40), D-12(10) | T-3(50) | 0.6 | a4 |

Example 1

2 g of the imidized polymer (B1) obtained in Synthesis Example 1 was dissolved in γ-butyrolactone to prepare a solution having a solid content of 4 wt % which was then filtered with a filter having an opening diameter of 1 μm to prepare the liquid crystal aligning agent of the present invention.

The above liquid crystal aligning agent was applied to the transparent electrode side of a glass substrate having the transparent electrode which was an ITO film by a printer for applying a liquid crystal aligning agent and dried on a hot plate heated at 180° C. for 20 minutes to form a coating film having a dry thickness of 0.05 μm.

This coating film was rubbed by a rubbing machine having a roll wound with rayon cloth at a roll revolution of 500 rpm, a stage moving rate of 1 cm/sec and a hair pull-in length of 0.4 mm.

An epoxy resin adhesive containing aluminum oxide spheres having a diameter of 17 μm was applied to peripheral portions having the liquid crystal alignment film of a pair of the rubbed liquid crystal sandwiching substrates by screen printing, the pair of the liquid crystal sandwiching substrates were contact bonded together in such a manner that their rubbing directions became opposite to each other and parallel to each other, and the adhesive was cured.

Then, nematic liquid crystals (MLC-5081 of Merk Co., Ltd.) were filled into the space between the pair of substrates from a liquid crystal filling port which was then sealed up with an epoxy-based adhesive, and a polarizer was affixed to the exterior sides of the substrates in such a manner that the polarization directions of the polarizers became the same as the rubbing directions of the liquid crystal alignment films of the substrates to manufacture a liquid crystal display element.

The obtained liquid crystal display element was evaluated for its residual DC voltage, after-image erase time, pretilt angle stability, reliability, light resistance and heat resistance. The evaluation results are shown in Table 15. Further, the rubbing resistance was evaluated using the above liquid crystal aligning agent. The results are shown in Table 15.

Examples 2 to 256 and Comparative Examples 1 to 4

Liquid crystal aligning agents were prepared in the same manner as in Example 1 except that polymers shown in Tables 1 to 14 were used, and liquid crystal display elements were manufactured by using these and evaluated. The evaluation results are shown in Tables 15 to 26.

TABLE 15

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satisfactory | Reliablity | Rubbing resistance | effect coefficient |
| 1 | B1 | — | 0.05 | 1 | 9.5 | 0.2 | Excellent | Excellent | 90 |
| 2 | B2 | — | 0.03 | 1 | 6.5 | 0.1 | Excellent | Excellent | 94 |
| 3 | B3 | — | 0.05 | 1 | 5.3 | 0.1 | Excellent | Excellent | 96 |
| 4 | B4 | — | 0.02 | 1 | 6.3 | 0.2 | Excellent | Excellent | 95 |
| 5 | B5 | — | 0.06 | 1 | 6.8 | 0.2 | Excellent | Excellent | 92 |
| 6 | B6 | — | 0.04 | 1 | 4.9 | 0.1 | Excellent | Excellent | 98 |

TABLE 15-continued

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satisfactory | Reliablity | Rubbing resistance | effect coefficient |
| 7  | B7  | — | 0.04 | 2 | 4.7 | 0.1 | Excellent | Excellent | 95 |
| 8  | B8  | — | 0.03 | 1 | 6.6 | 0.2 | Excellent | Excellent | 96 |
| 9  | B9  | — | 0.05 | 1 | 5.1 | 0.1 | Excellent | Excellent | 91 |
| 10 | B10 | — | 0.05 | 1 | 4.8 | 0.1 | Excellent | Excellent | 61 |
| 11 | B11 | — | 0.02 | 2 | 4.6 | 0.1 | Excellent | Excellent | 92 |
| 12 | B12 | — | 0.03 | 1 | 9.3 | 0.3 | Excellent | Excellent | 90 |
| 13 | B13 | — | 0.03 | 1 | 5.2 | 0.2 | Excellent | Excellent | 90 |
| 14 | B14 | — | 0.02 | 1 | 7.0 | 0.3 | Excellent | Excellent | 96 |
| 15 | B15 | — | 0.05 | 1 | 5.0 | 0.1 | Excellent | Excellent | 92 |
| 16 | B16 | — | 0.04 | 1 | 6.8 | 0.2 | Excellent | Excellent | 91 |
| 17 | B17 | — | 0.04 | 2 | 6.2 | 0.2 | Excellent | Excellent | 60 |
| 18 | B18 | — | 0.06 | 1 | 8.9 | 0.4 | Excellent | Excellent | 75 |
| 19 | B19 | — | 0.02 | 1 | 7.0 | 0.2 | Excellent | Excellent | 93 |
| 20 | B20 | — | 0.05 | 1 | 5.2 | 0.1 | Excellent | Excellent | 71 |
| 21 | B21 | — | 0.04 | 1 | 4.5 | 0.2 | Excellent | Excellent | 95 |
| 22 | B22 | — | 0.01 | 1 | 4.8 | 0.1 | Excellent | Excellent | 96 |

Ex. = Example

TABLE 16

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satisfactory | Reliablity | Rubbing resistance | effect coefficient |
| 23 | B23 | — | 0.04 | 1 | 4.6 | 0.1 | Excellent | Excellent | 93 |
| 24 | B24 | — | 0.03 | 1 | 4.9 | 0.1 | Excellent | Excellent | 95 |
| 25 | B25 | — | 0.04 | 1 | 4.4 | 0.1 | Excellent | Excellent | 93 |
| 26 | B26 | — | 0.04 | 1 | 4.7 | 0.2 | Excellent | Excellent | 95 |
| 27 | B27 | — | 0.05 | 1 | 4.2 | 0.1 | Excellent | Excellent | 93 |
| 28 | B28 | — | 0.02 | 1 | 4.6 | 0.1 | Excellent | Excellent | 94 |
| 29 | B29 | — | 0.02 | 1 | 4.3 | 0.1 | Excellent | Excellent | 95 |
| 30 | B30 | — | 0.04 | 2 | 4.8 | 0.2 | Excellent | Excellent | 73 |
| 31 | B31 | — | 0.05 | 1 | 9.8 | 0.4 | Excellent | Excellent | 94 |
| 32 | B32 | — | 0.05 | 1 | 6.9 | 0.2 | Excellent | Excellent | 95 |
| 33 | B33 | — | 0.01 | 1 | 5.0 | 0.1 | Excellent | Excellent | 95 |
| 34 | B34 | — | 0.02 | 1 | 6.6 | 0.2 | Excellent | Excellent | 94 |
| 35 | B35 | — | 0.04 | 1 | 7.4 | 0.1 | Excellent | Excellent | 95 |
| 36 | B36 | — | 0.02 | 1 | 4.5 | 0.1 | Excellent | Excellent | 92 |
| 37 | B37 | — | 0.05 | 1 | 4.3 | 0.1 | Excellent | Excellent | 94 |
| 38 | B38 | — | 0.03 | 1 | 6.8 | 0.3 | Excellent | Excellent | 94 |
| 39 | B39 | — | 0.05 | 1 | 5.0 | 0.1 | Excellent | Excellent | 94 |
| 40 | B40 | — | 0.01 | 1 | 5.1 | 0.1 | Excellent | Excellent | 62 |
| 41 | B41 | — | 0.05 | 1 | 4.6 | 0.1 | Excellent | Excellent | 95 |
| 42 | B42 | — | 0.05 | 1 | 9.2 | 0.2 | Excellent | Excellent | 92 |
| 43 | B43 | — | 0.02 | 1 | 5.1 | 0.1 | Excellent | Excellent | 91 |
| 44 | B44 | — | 0.04 | 1 | 6.6 | 0.2 | Excellent | Excellent | 93 |

Ex. = Example

TABLE 17

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satisfactory | Reliablity | Rubbing resistance | effect coefficient |
| 45 | B45 | — | 0.03 | 1 | 5.2 | 0.1 | Excellent | Excellent | 92 |
| 45 | B45 | — | 0.03 | 1 | 5.2 | 0.1 | Excellent | Excellent | 92 |
| 46 | B46 | — | 0.01 | 1 | 7.4 | 0.2 | Excellent | Excellent | 94 |
| 47 | B47 | — | 0.01 | 1 | 5.6 | 0.2 | Excellent | Excellent | 60 |
| 48 | B48 | — | 0.03 | 1 | 9.7 | 0.3 | Excellent | Excellent | 73 |
| 49 | B49 | — | 0.02 | 1 | 7.1 | 0.2 | Excellent | Excellent | 95 |
| 50 | B50 | — | 0.04 | 1 | 4.8 | 0.1 | Excellent | Excellent | 76 |
| 51 | B51 | — | 0.03 | 1 | 4.9 | 0.1 | Excellent | Excellent | 94 |
| 52 | B52 | — | 0.05 | 1 | 4.6 | 0.1 | Excellent | Excellent | 95 |
| 53 | B53 | — | 0.05 | 1 | 4.5 | 0.1 | Excellent | Excellent | 96 |

TABLE 17-continued

| Ex. | Polymer Type | Polymer Weight ratio | Residual DC (V) | After-image erase time (minutes) | Pretilt angle stability Room temperature | Pretilt angle stability Reduction Satisfactory | Reliablity | Rubbing resistance | Light resistance · heat resistance effect coefficient |
|---|---|---|---|---|---|---|---|---|---|
| 54 | B54 | — | 0.02 | 1 | 4.9 | 0.2 | Excellent | Excellent | 92 |
| 55 | B55 | — | 0.02 | 1 | 4.4 | 0.1 | Excellent | Excellent | 94 |
| 56 | B56 | — | 0.05 | 1 | 4.3 | 0.1 | Excellent | Excellent | 93 |
| 57 | B57 | — | 0.04 | 1 | 4.0 | 0.1 | Excellent | Excellent | 91 |
| 58 | B58 | — | 0.05 | 1 | 4.9 | 0.1 | Excellent | Excellent | 92 |
| 59 | B59 | — | 0.04 | 1 | 5.1 | 0.1 | Excellent | Excellent | 94 |
| 60 | B60 | — | 0.04 | 1 | 4.5 | 0.1 | Excellent | Excellent | 73 |
| 61 | B61 | — | 0.02 | 1 | 9.3 | 0.2 | Excellent | Excellent | 93 |
| 62 | B62 | — | 0.05 | 1 | 6.2 | 0.3 | Excellent | Excellent | 95 |
| 63 | B63 | — | 0.03 | 1 | 4.5 | 0.2 | Excellent | Excellent | 91 |
| 64 | B64 | — | 0.03 | 1 | 6.0 | 0.1 | Excellent | Excellent | 93 |
| 65 | B65 | — | 0.02 | 1 | 7.2 | 0.2 | Excellent | Excellent | 95 |
| 66 | B66 | — | 0.05 | 1 | 5.1 | 0.1 | Excellent | Excellent | 92 |

Ex. = Example

TABLE 18

| Ex. | Polymer Type | Polymer Weight ratio | Residual DC (V) | After-image erase time (minutes) | Pretilt angle stability Room temperature | Pretilt angle stability Reduction Satisfactory | Reliablity | Rubbing resistance | Light resistance · heat resistance effect coefficient |
|---|---|---|---|---|---|---|---|---|---|
| 67 | B67 | — | 0.01 | 1 | 4.6 | 0.1 | Excellent | Excellent | 94 |
| 68 | B68 | — | 0.03 | 2 | 6.3 | 0.2 | Excellent | Excellent | 92 |
| 69 | B69 | — | 0.02 | 2 | 4.9 | 0.2 | Excellent | Excellent | 94 |
| 70 | B70 | — | 0.03 | 2 | 5.3 | 0.1 | Excellent | Excellent | 58 |
| 71 | B71 | — | 0.03 | 2 | 4.4 | 0.1 | Excellent | Excellent | 93 |
| 72 | B72 | — | 0.05 | 1 | 9.5 | 0.3 | Excellent | Excellent | 95 |
| 73 | B73 | — | 0.05 | 1 | 5.0 | 0.1 | Excellent | Excellent | 92 |
| 74 | B74 | — | 0.05 | 2 | 6.2 | 0.1 | Excellent | Excellent | 95 |
| 75 | B75 | — | 0.02 | 1 | 4.6 | 0.1 | Excellent | Excellent | 94 |
| 76 | B76 | — | 0.03 | 1 | 6.9 | 0.3 | Excellent | Excellent | 95 |
| 77 | B77 | — | 0.05 | 1 | 5.9 | 0.1 | Excellent | Excellent | 60 |
| 78 | B78 | — | 0.01 | 1 | 8.6 | 0.2 | Excellent | Excellent | 76 |
| 79 | B79 | — | 0.04 | 1 | 6.7 | 0.1 | Excellent | Excellent | 93 |
| 80 | B80 | — | 0.04 | 1 | 4.9 | 0.1 | Excellent | Excellent | 74 |
| 81 | B81 | — | 0.03 | 1 | 4.7 | 0.2 | Excellent | Excellent | 95 |
| 82 | B82 | — | 0.03 | 1 | 4.6 | 0.1 | Excellent | Excellent | 94 |
| 83 | B83 | — | 0.05 | 1 | 4.3 | 0.1 | Excellent | Excellent | 95 |
| 84 | B84 | — | 0.04 | 1 | 4.6 | 0.1 | Excellent | Excellent | 92 |
| 85 | B85 | — | 0.06 | 1 | 4.5 | 0.1 | Excellent | Excellent | 95 |
| 86 | B86 | — | 0.02 | 1 | 4.3 | 0.1 | Excellent | Excellent | 93 |
| 87 | B87 | — | 0.03 | 1 | 4.1 | 0.1 | Excellent | Excellent | 94 |
| 88 | B88 | — | 0.03 | 1 | 4.7 | 0.2 | Excellent | Excellent | 94 |

Ex. = Example

TABLE 19

| Ex. | Polymer Type | Polymer Weight ratio | Residual DC (V) | After-image erase time (minutes) | Pretilt angle stability Room temperature | Pretilt angle stability Reduction Satisfactory | Reliablity | Rubbing resistance | Light resistance · heat resistance effect coefficient |
|---|---|---|---|---|---|---|---|---|---|
| 89 | B89 | — | 0.05 | 1 | 5.3 | 0.2 | Excellent | Excellent | 91 |
| 90 | B90 | — | 0.05 | 1 | 4.3 | 0.1 | Excellent | Excellent | 72 |
| 91 | B91 | — | 0.07 | 2 | 5.4 | 0.2 | Excellent | Excellent | 92 |
| 92 | B92 | — | 0.06 | 1 | 4.9 | 0.1 | Excellent | Excellent | 91 |
| 93 | B93 | — | 0.04 | 2 | 5.8 | 0.3 | Excellent | Excellent | 90 |
| 94 | B94 | — | 0.05 | 2 | 6.2 | 0.3 | Excellent | Excellent | 92 |
| 95 | B95 | — | 0.04 | 2 | 4.5 | 0.1 | Excellent | Excellent | 89 |
| 96 | B96 | — | 0.06 | 1 | 4.3 | 0.1 | Excellent | Excellent | 93 |
| 97 | B97 | — | 0.05 | 2 | 5.5 | 0.2 | Excellent | Excellent | 92 |
| 98 | B98 | — | 0.06 | 1 | 4.2 | 0.2 | Excellent | Excellent | 94 |
| 99 | B99 | — | 0.03 | 1 | 6.0 | 0.3 | Excellent | Excellent | 91 |
| 100 | B100 | — | 0.05 | 1 | 5.5 | 0.3 | Excellent | Excellent | 92 |
| 101 | B101 | — | 0.04 | 2 | 4.4 | 0.2 | Excellent | Excellent | 93 |

TABLE 19-continued

| Ex. | Polymer Type | Polymer Weight ratio | Residual DC (V) | After-image erase time (minutes) | Pretilt angle stability Room temperature | Pretilt angle stability Reduction Satisfactory | Reliablity | Rubbing resistance | Light resistance · heat resistance effect coefficient |
|---|---|---|---|---|---|---|---|---|---|
| 102 | B102 | — | 0.03 | 1 | 5.3 | 0.2 | Excellent | Excellent | 91 |
| 103 | B103 | — | 0.05 | 1 | 5.7 | 0.2 | Excellent | Excellent | 90 |
| 104 | B104 | — | 0.04 | 2 | 5.4 | 0.1 | Excellent | Excellent | 93 |
| 105 | B105 | — | 0.02 | 1 | 4.8 | 0.1 | Excellent | Excellent | 93 |
| 106 | B106 | — | 0.04 | 2 | 5.4 | 0.1 | Excellent | Excellent | 92 |
| 107 | B107 | — | 0.04 | 1 | 6.1 | 0.2 | Excellent | Excellent | 91 |
| 108 | B108 | — | 0.03 | 1 | 5.2 | 0.2 | Excellent | Excellent | 89 |
| 109 | B109 | — | 0.05 | 2 | 5.8 | 0.3 | Excellent | Excellent | 90 |
| 110 | B110 | — | 0.02 | 2 | 5.3 | 0.2 | Excellent | Excellent | 94 |

Ex. = Example

TABLE 20

| Ex. | Polymer Type | Polymer Weight ratio | Residual DC (V) | After-image erase time (minutes) | Pretilt angle stability Room temperature | Pretilt angle stability Reduction Satisfactory | Reliablity | Rubbing resistance | Light resistance · heat resistance effect coefficient |
|---|---|---|---|---|---|---|---|---|---|
| 111 | B111 | — | 0.03 | 1 | 4.6 | 0.1 | Excellent | Excellent | 92 |
| 112 | B112 | — | 0.06 | 1 | 4.7 | 0.1 | Excellent | Excellent | 93 |
| 113 | B113 | — | 0.05 | 1 | 5.4 | 0.2 | Excellent | Excellent | 91 |
| 114 | B114 | — | 0.04 | 1 | 6.0 | 0.2 | Excellent | Excellent | 91 |
| 115 | B115 | — | 0.05 | 2 | 4.8 | 0.2 | Excellent | Excellent | 93 |
| 116 | B116 | — | 0.03 | 1 | 5.4 | 0.2 | Excellent | Excellent | 92 |
| 117 | B117 | — | 0.02 | 1 | 5.7 | 0.2 | Excellent | Excellent | 93 |
| 118 | B118 | — | 0.06 | 2 | 5.3 | 0.2 | Excellent | Excellent | 94 |
| 119 | B119 | — | 0.04 | 1 | 5.6 | 0.3 | Excellent | Excellent | 92 |
| 120 | B120 | — | 0.05 | 1 | 5.2 | 0.2 | Excellent | Excellent | 93 |
| 121 | B121 | — | 0.03 | 1 | 5.8 | 0.2 | Excellent | Excellent | 94 |
| 122 | B122 | — | 0.05 | 2 | 5.2 | 0.2 | Excellent | Excellent | 93 |
| 123 | B123 | — | 0.04 | 1 | 4.9 | 0.2 | Excellent | Excellent | 91 |
| 124 | B124 | — | 0.06 | 1 | 5.1 | 0.2 | Excellent | Excellent | 90 |
| 125 | B125 | — | 0.03 | 1 | 5.6 | 0.1 | Excellent | Excellent | 90 |
| 126 | B126 | — | 0.03 | 2 | 5.3 | 0.1 | Excellent | Excellent | 93 |
| 127 | B127 | — | 0.04 | 1 | 5.8 | 0.2 | Excellent | Excellent | 94 |
| 128 | B128 | — | 0.05 | 1 | 5.2 | 0.2 | Excellent | Excellent | 92 |
| 129 | B129 | — | 0.04 | 1 | 4.7 | 0.2 | Excellent | Excellent | 92 |
| 130 | B130 | — | 0.04 | 1 | 4.9 | 0.2 | Excellent | Excellent | 94 |
| 131 | B131 | — | 0.05 | 1 | 5.0 | 0.2 | Excellent | Excellent | 93 |
| 132 | B132 | — | 0.03 | 2 | 4.6 | 0.2 | Excellent | Excellent | 92 |

Ex. = Example

TABLE 21

| Ex. | Polymer Type | Polymer Weight ratio | Residual DC (V) | After-image erase time (minutes) | Pretilt angle stability Room temperature | Pretilt angle stability Reduction Satisfactory | Reliablity | Rubbing resistance | Light resistance · heat resistance effect coefficient |
|---|---|---|---|---|---|---|---|---|---|
| 133 | B133 | — | 0.06 | 1 | 5.7 | 0.2 | Excellent | Excellent | 94 |
| 134 | B134 | — | 0.03 | 1 | 4.4 | 0.2 | Excellent | Excellent | 93 |
| 135 | B135 | — | 0.06 | 1 | 5.6 | 0.3 | Excellent | Excellent | 92 |
| 136 | B136 | — | 0.03 | 2 | 5.8 | 0.3 | Excellent | Excellent | 94 |
| 137 | B137 | — | 0.04 | 2 | 4.6 | 0.2 | Excellent | Excellent | 93 |
| 138 | B138 | — | 0.05 | 1 | 5.3 | 0.2 | Excellent | Excellent | 94 |
| 139 | B139 | — | 0.02 | 2 | 5.5 | 0.2 | Excellent | Excellent | 92 |
| 140 | B140 | — | 0.03 | 1 | 6.0 | 0.3 | Excellent | Excellent | 91 |
| 141 | B141 | — | 0.06 | 1 | 5.2 | 0.2 | Excellent | Excellent | 92 |
| 142 | B142 | — | 0.05 | 2 | 4.5 | 0.2 | Excellent | Excellent | 90 |
| 143 | B143 | — | 0.04 | 1 | 5.0 | 0.2 | Excellent | Excellent | 91 |
| 144 | B144 | — | 0.03 | 1 | 6.2 | 0.2 | Excellent | Excellent | 90 |
| 145 | B145 | — | 0.05 | 1 | 5.5 | 0.3 | Excellent | Excellent | 88 |
| 146 | B146 | — | 0.04 | 2 | 5.1 | 0.2 | Excellent | Excellent | 92 |
| 147 | B147 | — | 0.05 | 1 | 5.3 | 0.1 | Excellent | Excellent | 93 |
| 148 | B148 | — | 0.03 | 1 | 6.1 | 0.3 | Excellent | Excellent | 93 |
| 149 | B149 | — | 0.06 | 1 | 6.4 | 0.3 | Excellent | Excellent | 90 |

TABLE 21-continued

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satisfactory | Reliablity | Rubbing resistance | effect coefficient |
| 150 | B150 | — | 0.05 | 2 | 5.2 | 0.2 | Excellent | Excellent | 91 |
| 151 | B151 | — | 0.04 | 1 | 5.5 | 0.2 | Excellent | Excellent | 90 |
| 152 | B152 | — | 0.03 | 1 | 5.3 | 0.2 | Excellent | Excellent | 92 |
| 153 | B153 | — | 0.03 | 1 | 5.6 | 0.2 | Excellent | Excellent | 91 |
| 154 | B154 | — | 0.05 | 2 | 6.3 | 0.3 | Excellent | Excellent | 88 |

Ex. = Example

TABLE 22

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satisfactory | Reliablity | Rubbing resistance | effect coefficient |
| 155 | B115 | — | 0.04 | 1 | 5.3 | 0.2 | Excellent | Excellent | 90 |
| 156 | B156 | — | 0.04 | 2 | 4.7 | 0.2 | Excellent | Excellent | 91 |
| 157 | B157 | — | 0.03 | 1 | 4.5 | 0.2 | Excellent | Excellent | 93 |
| 158 | B158 | — | 0.05 | 1 | 5.2 | 0.2 | Excellent | Excellent | 92 |
| 159 | B159 | — | 0.04 | 2 | 4.8 | 0.2 | Excellent | Excellent | 90 |
| 160 | B160 | — | 0.03 | 1 | 5.5 | 0.2 | Excellent | Excellent | 91 |
| 161 | B161 | — | 0.05 | 2 | 4.7 | 0.2 | Excellent | Excellent | 90 |
| 162 | B162 | — | 0.03 | 1 | 4.5 | 0.2 | Excellent | Excellent | 92 |
| 163 | B163 | — | 0.06 | 1 | 5.5 | 0.2 | Excellent | Excellent | 91 |
| 164 | B164 | — | 0.05 | 1 | 5.2 | 0.2 | Excellent | Excellent | 91 |
| 165 | B165 | — | 0.06 | 2 | 5.1 | 0.2 | Excellent | Excellent | 93 |
| 166 | B166 | — | 0.07 | 1 | 5.6 | 0.2 | Excellent | Excellent | 92 |
| 167 | B167 | — | 0.05 | 2 | 5.1 | 0.1 | Excellent | Excellent | 91 |
| 168 | B168 | — | 0.04 | 1 | 5.0 | 0.1 | Excellent | Excellent | 92 |
| 169 | B169 | — | 0.06 | 1 | 4.7 | 0.2 | Excellent | Excellent | 88 |
| 170 | B170 | — | 0.03 | 1 | 4.9 | 0.2 | Excellent | Excellent | 92 |
| 171 | B171 | — | 0.06 | 1 | 5.4 | 0.2 | Excellent | Excellent | 89 |
| 172 | B172 | — | 0.03 | 1 | 5.8 | 0.2 | Excellent | Excellent | 93 |
| 173 | B173 | — | 0.03 | 1 | 5.2 | 0.2 | Excellent | Excellent | 90 |
| 174 | B174 | — | 0.05 | 2 | 5.5 | 0.3 | Excellent | Excellent | 91 |
| 175 | B175 | — | 0.04 | 2 | 5.7 | 0.3 | Excellent | Excellent | 91 |
| 176 | B176 | — | 0.03 | 1 | 5.4 | 0.2 | Excellent | Excellent | 93 |

Ex. = Example

TABLE 23

| | Polymer | | | After-image | Pretilt angle stability | | | | Light resistance · heat resistance |
|---|---|---|---|---|---|---|---|---|---|
| Ex. | Type | Weight ratio | Residual DC (V) | erase time (minutes) | Room temperature | Reduction Satifactory | Reliablity | Rubbing resistance | effect coefficient |
| 177 | B177 | — | 0.05 | 1 | 5.8 | 0.3 | Excellent | Excellent | 90 |
| 178 | B178 | — | 0.04 | 1 | 5.3 | 0.2 | Excellent | Excellent | 88 |
| 179 | B179 | — | 0.04 | 1 | 5.5 | 0.2 | Excellent | Excellent | 92 |
| 180 | B180 | — | 0.03 | 1 | 5.2 | 0.2 | Excellent | Excellent | 91 |
| 181 | B181 | — | 0.05 | 1 | 5.6 | 0.2 | Excellent | Excellent | 90 |
| 182 | B182 | — | 0.04 | 1 | 5.3 | 0.2 | Excellent | Excellent | 93 |
| 183 | B183 | — | 0.06 | 1 | 5.3 | 0.3 | Excellent | Excellent | 91 |
| 184 | B184 | — | 0.05 | 2 | 5.7 | 0.3 | Excellent | Excellent | 92 |
| 185 | B185 | — | 0.04 | 1 | 5.5 | 0.2 | Excellent | Excellent | 91 |
| 186 | B186 | — | 0.05 | 2 | 5.6 | 0.2 | Excellent | Excellent | 93 |
| 187 | B187 | — | 0.04 | 2 | 6.3 | 0.3 | Excellent | Excellent | 90 |
| 188 | B188 | — | 0.04 | 1 | 4.5 | 0.2 | Excellent | Excellent | 89 |
| 189 | B189 | — | 0.05 | 1 | 4.1 | 0.1 | Excellent | Excellent | 91 |
| 190 | B190 | — | 0.06 | 2 | 5.3 | 0.1 | Excellent | Excellent | 93 |
| 191 | B191 | — | 0.05 | 1 | 5.6 | 0.1 | Excellent | Excellent | 92 |
| 192 | B192 | — | 0.04 | 1 | 5.5 | 0.2 | Excellent | Excellent | 94 |
| 193 | B193 | — | 0.03 | 2 | 5.2 | 0.1 | Excellent | Excellent | 92 |
| 194 | B194 | — | 0.05 | 1 | 5.7 | 0.2 | Excellent | Excellent | 92 |
| 195 | B195 | — | 0.04 | 1 | 4.8 | 0.2 | Excellent | Excellent | 93 |

TABLE 23-continued

| | Polymer | | After-image | Pretilt angle stability | | | | Light resistance · heat resistance |
|---|---|---|---|---|---|---|---|---|
| Ex. | Type | Weight ratio | Residual DC (V) | erase time (minutes) | Room temperature | Reduction Satifactory | Reliability | Rubbing resistance | effect coefficient |
| 196 | B196 | — | 0.03 | 1 | 5.2 | 0.1 | Excellent | Excellent | 94 |
| 197 | B197 | — | 0.05 | 2 | 6.0 | 0.2 | Excellent | Excellent | 91 |
| 198 | B198 | — | 0.04 | 1 | 5.4 | 0.2 | Excellent | Excellent | 90 |

Ex. = Example

TABLE 24

| | Polymer | | After-image | Pretilt angle stability | | | | Light resistance · heat resistance |
|---|---|---|---|---|---|---|---|---|
| Ex. | Type | Weight ratio | Residual DC (V) | erase time (minutes) | Room temperature | Reduction Satifactory | Reliability | Rubbing resistance | effect coefficient |
| 199 | B199 | — | 0.03 | 1 | 5.8 | 0.2 | Excellent | Excellent | 93 |
| 200 | B200 | — | 0.03 | 1 | 5.6 | 0.1 | Excellent | Excellent | 92 |
| 201 | B201 | — | 0.05 | 1 | 4.7 | 0.2 | Excellent | Excellent | 91 |
| 202 | B202 | — | 0.06 | 1 | 5.3 | 0.1 | Excellent | Excellent | 90 |
| 203 | B203 | — | 0.07 | 2 | 5.5 | 0.2 | Excellent | Excellent | 92 |
| 204 | B204 | — | 0.05 | 2 | 4.8 | 0.1 | Excellent | Excellent | 90 |
| 205 | B205 | — | 0.04 | 1 | 5.7 | 0.1 | Excellent | Excellent | 90 |
| 206 | B206 | — | 0.04 | 2 | 5.2 | 0.1 | Excellent | Excellent | 88 |
| 207 | B207 | — | 0.05 | 1 | 5.1 | 0.2 | Excellent | Excellent | 92 |
| 208 | B208 | — | 0.04 | 1 | 5.3 | 0.2 | Excellent | Excellent | 92 |
| 209 | B209 | — | 0.05 | 2 | 5.5 | 0.1 | Excellent | Excellent | 91 |
| 210 | B210 | — | 0.04 | 1 | 5.2 | 0.1 | Excellent | Excellent | 92 |
| 211 | A91 | — | 0.02 | 1 | 8.9 | 0.4 | Excellent | Excellent | 87 |
| 212 | A92 | — | 0.04 | 1 | 6.5 | 0.1 | Excellent | Excellent | 85 |
| 213 | A93 | — | 0.03 | 1 | 5.7 | 0.2 | Excellent | Excellent | 83 |
| 214 | A94 | — | 0.02 | 1 | 6.1 | 0.1 | Excellent | Excellent | 84 |
| 215 | A95 | — | 0.05 | 1 | 7.3 | 0.3 | Excellent | Excellent | 86 |
| 216 | A96 | — | 0.04 | 1 | 5.2 | 0.1 | Excellent | Excellent | 89 |
| 217 | A97 | — | 0.03 | 2 | 4.5 | 0.1 | Excellent | Excellent | 85 |
| 218 | A98 | — | 0.03 | 1 | 6.2 | 0.2 | Excellent | Excellent | 92 |
| 219 | A99 | — | 0.03 | 1 | 5.2 | 0.1 | Excellent | Excellent | 81 |
| 220 | A100 | — | 0.05 | 1 | 4.5 | 0.2 | Excellent | Excellent | 83 |

Ex. = Example

TABLE 25

| | Polymer | | After-image | Pretilt angle stability | | | | Light resistance · heat resistance |
|---|---|---|---|---|---|---|---|---|
| Ex. | Type | Weight ratio | Residual DC (V) | erase time (minutes) | Room temperature | Reduction Satifactory | Reliability | Rubbing resistance | effect coefficient |
| 221 | A101 | — | 0.02 | 1 | 4.9 | 0.1 | Excellent | Excellent | 90 |
| 222 | A102 | — | 0.04 | 1 | 9.6 | 0.2 | Excellent | Excellent | 91 |
| 223 | A103 | — | 0.02 | 1 | 5.4 | 0.1 | Excellent | Excellent | 91 |
| 224 | A104 | — | 0.03 | 1 | 7.2 | 0.2 | Excellent | Excellent | 92 |
| 225 | A105 | — | 0.01 | 2 | 4.6 | 0.1 | Excellent | Excellent | 89 |
| 226 | A106 | — | 0.01 | 1 | 7.4 | 0.1 | Excellent | Excellent | 92 |
| 227 | A107 | — | 0.04 | 1 | 6.5 | 0.2 | Excellent | Excellent | 88 |
| 228 | A108 | — | 0.04 | 1 | 9.3 | 0.3 | Excellent | Excellent | 85 |
| 229 | A109 | — | 0.06 | 1 | 6.8 | 0.1 | Excellent | Excellent | 82 |
| 230 | A110 | — | 0.05 | 1 | 5.4 | 0.1 | Excellent | Excellent | 89 |
| 231 | A111 | — | 0.05 | 1 | 4.9 | 0.1 | Excellent | Excellent | 84 |
| 232 | A112 | — | 0.04 | 1 | 4.5 | 0.1 | Excellent | Excellent | 90 |
| 233 | A113 | — | 0.04 | 1 | 4.3 | 0.1 | Excellent | Excellent | 86 |
| 234 | A114 | — | 0.03 | 1 | 5.2 | 0.2 | Excellent | Excellent | 83 |
| 235 | A115 | — | 0.03 | 1 | 4.6 | 0.1 | Excellent | Excellent | 89 |
| 236 | A116 | — | 0.05 | 1 | 5.2 | 0.1 | Excellent | Excellent | 88 |
| 237 | A117 | — | 0.05 | 1 | 4.5 | 0.1 | Excellent | Excellent | 91 |

TABLE 25-continued

| | Polymer | | | After-image | Pretilt angle stability | | | | Light resistance · heat resistance |
| --- | --- | --- | --- | --- | --- | --- | --- | --- | --- |
| Ex. | Type | Weight ratio | Residual DC (V) | erase time (minutes) | Room temperature | Reduction Satifactory | Reliability | Rubbing resistance | effect coefficient |
| 238 | A118 | — | 0.04 | 1 | 4.8 | 0.2 | Excellent | Excellent | 83 |
| 239 | A119 | — | 0.04 | 1 | 4.5 | 0.1 | Excellent | Excellent | 91 |
| 240 | A120 | — | 0.01 | 1 | 5.2 | 0.1 | Excellent | Excellent | 87 |

Ex. = Example

TABLE 26

| | Polymer | | | After-image | Pretilt angle stability | | | | Light resistance · heat resistance |
| --- | --- | --- | --- | --- | --- | --- | --- | --- | --- |
| Ex. | Type | Weight ratio | Residual DC (V) | erase time (minutes) | Room temperature | Reduction Satifactory | Reliability | Rubbing resistance | effect coefficient |
| 177 | A1/A2 | 50/50 | 0.03 | 1 | 7.2 | 0.2 | Excellent | Excellent | 84 |
| 242 | A1/A3 | 50/50 | 0.03 | 2 | 6.4 | 0.2 | Excellent | Excellent | 89 |
| 243 | A2/A60 | 60/40 | 0.02 | 1 | 5.3 | 0.1 | Excellent | Excellent | 90 |
| 244 | A65/A91 | 50/50 | 0.02 | 1 | 7.1 | 0.1 | Excellent | Excellent | 92 |
| 245 | A74/A116 | 50/50 | 0.05 | 2 | 6.4 | 0.2 | Excellent | Excellent | 89 |
| 246 | A89/A101 | 60/40 | 0.01 | 1 | 5.8 | 0.2 | Excellent | Excellent | 87 |
| 247 | A89/A101 | 20/80 | 0.04 | 1 | 4.9 | 0.1 | Excellent | Excellent | 91 |
| 248 | A95/A120 | 10/90 | 0.03 | 1 | 6.3 | 0.2 | Excellent | Excellent | 89 |
| 249 | A51/A98 | 20/80 | 0.02 | 1 | 5.6 | 0.2 | Excellent | Excellent | 88 |
| 250 | A45/A93 | 30/70 | 0.02 | 1 | 5.4 | 0.1 | Excellent | Excellent | 93 |
| 251 | A62/A77 | 25/75 | 0.05 | 2 | 5.7 | 0.2 | Excellent | Excellent | 90 |
| 252 | A81/A103 | 10/90 | 0.05 | 2 | 6.1 | 0.2 | Excellent | Excellent | 84 |
| 253 | A11/A32 | 70/30 | 0.03 | 1 | 7.1 | 0.1 | Excellent | Excellent | 82 |
| 254 | A115/A120 | 40/60 | 0.04 | 1 | 5.8 | 0.1 | Excellent | Excellent | 89 |
| 255 | A85/A100 | 12/88 | 0.05 | 1 | 8.5 | 0.3 | Excellent | Excellent | 90 |
| 256 | A43/A82 | 45/55 | 0.02 | 1 | 5.7 | 0.2 | Excellent | Excellent | 82 |

| | Polymer | | | After-image | Pretilt angle stability | | | | Light resistance · heat resistance |
| --- | --- | --- | --- | --- | --- | --- | --- | --- | --- |
| C. Ex. | Type | Weight ratio | Residual DC (V) | erase time (minutes) | Room temperature | Reduction Satifactory | Reliability | Rubbing resistance | effect coefficient |
| 1 | b1 | — | 0.15 | 10 | 2.2 | 0.6 | Excellent | Peeled | 32 |
| 2 | b2 | — | 0.25 | 11 | 18.5 | 15.1 | White stain | Peeled | 15 |
| 3 | b3 | — | 0.20 | 14 | 3.5 | 1.6 | White stain | Peeled | |
| 4 | a4 | — | 0.31 | 20 | 9.5 | 2.1 | White stain | Excellent | 30 |

Ex. = Example
C. Ex. = Comparative Example

EFFECT OF THE INVENTION

According to the present invention, there is provided a liquid crystal aligning agent which provides a liquid crystal alignment film suitable for use in a liquid crystal display element having high reliability regardless of film thickness and step conditions such as rubbing conditions.

Further, a liquid crystal display element having a liquid crystal alignment film formed from the liquid crystal aligning agent of the present invention has excellent alignability for liquid crystals, reliability, light resistance and heat resistance and can be effectively used in a display device for various apparatuses such as desk-top computers, wrist-watches, clocks, coefficient display panels, word-processors, personal computers, liquid crystal data projectors and liquid crystal TVs.

What is claimed is:

1. A liquid crystal aligning agent, comprising:
one polymer selected from the group consisting of a polyamic acid and an imidized polymer of the polyamic acid, and an organic solvent in which said one polymer is dissolved,
wherein said polymer has both of the following structures (1) and (2):
(1) it has at least one structure selected from the group consisting of structures represented by the following formulas (1) to (10); and
(2) it has at least one structure selected from the group consisting of structures represented by the following formulas (a) to (z):

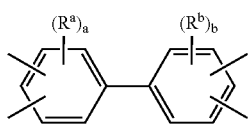

(1)

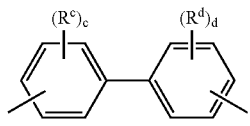

(2)

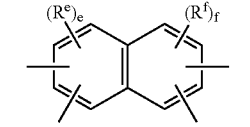

(3)

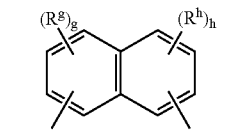

(4)

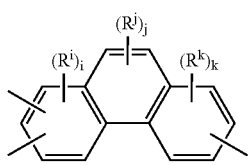

(5)

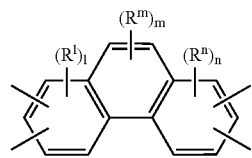

(6)

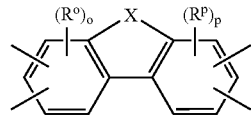

(7)

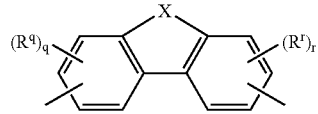

(8)

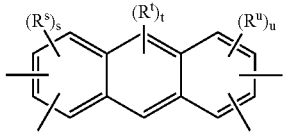

(9)

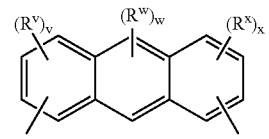

(10)

wherein $R^a$ to $R^x$ are each independently a halogen atom or monovalent organic group, X is a monvalent organic group or oxygen atom, a, b, g, h, l, n, q, r, v and x are each independently an integer of 0 to 3, e, f, i, j, k, m, o, p, s, t, u and w are each independently an integer of 0 to 2, and c and d are each independently an integer of 0 to 4;

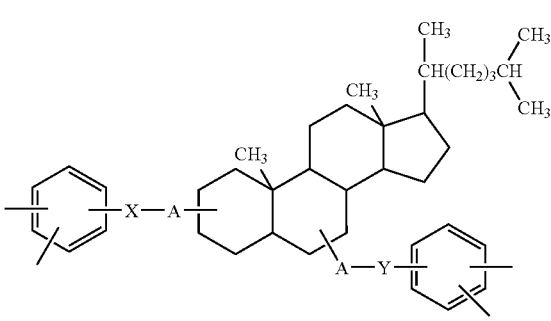

(a)

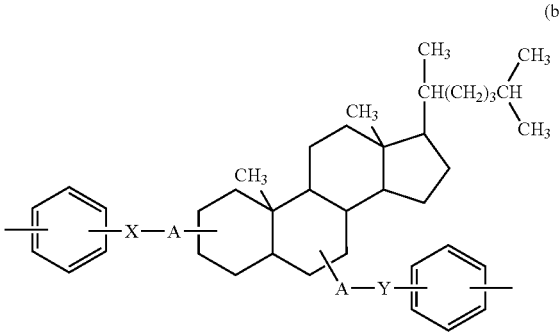

(b)

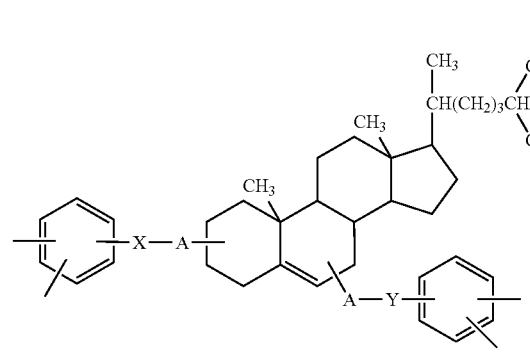
(c)
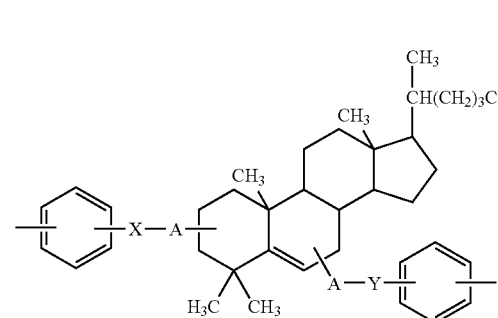
(h)
(d)
(i)
(e)
(j)
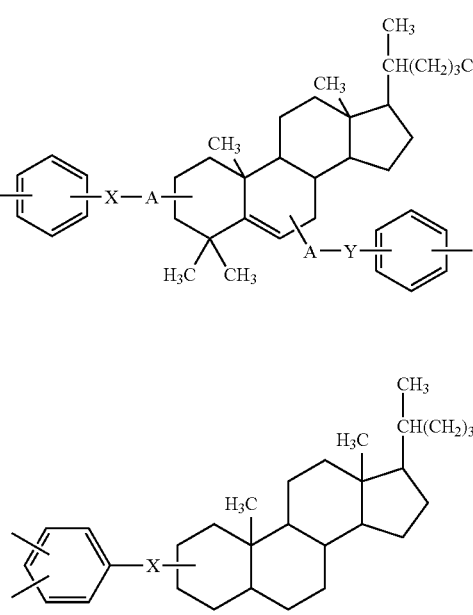
(f)
(k)
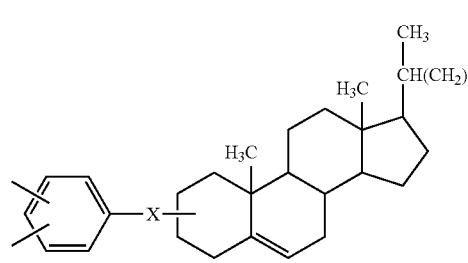
(g)
(l)
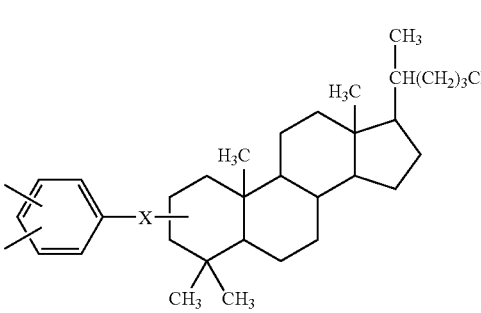
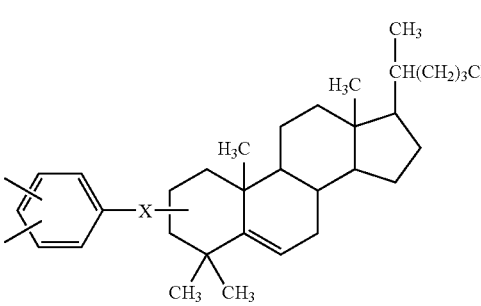

(m)
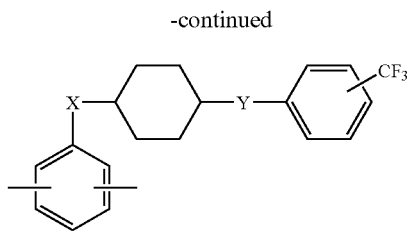

(n)
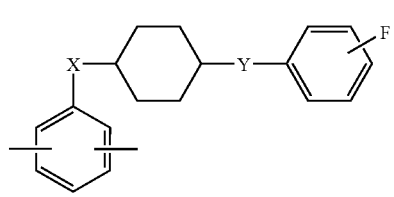

wherein A is a phenylene group or single bond, X and Y are each independently a divalent group selected from the group consisting of —O—, —CO—, —COO—, —OCO—, —NHCO—, —CONH—, —S—, —Ar—Ar—CH$_3$— (wherein Ar is a phenylene group), methylene group, alkylene group having 2 to 6 carbon atoms and phenylene group, (o)

(p)

(q)

(r)

(s)

(t)
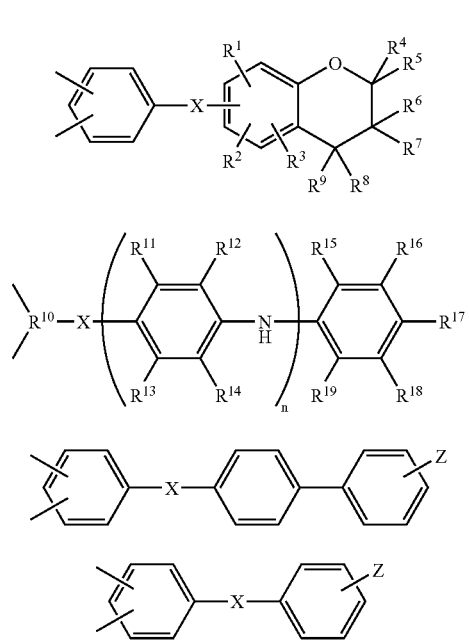
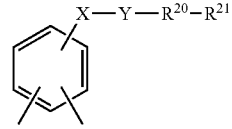
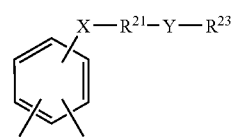

(u)
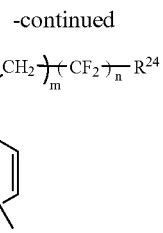

(v)

(w)
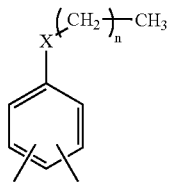

(x)
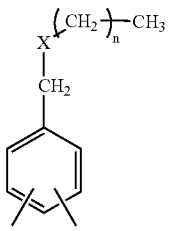

(y)
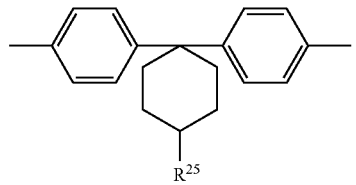

(z)
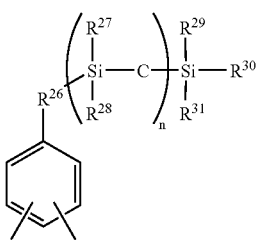

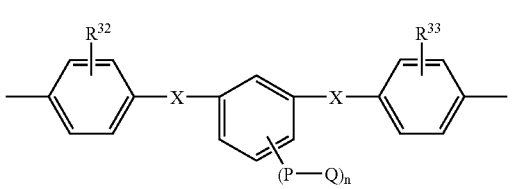

wherein X and Y are each independently a divalent group selected from the group consisting of —O—, —CO—, —COO—, —OCO—, —NHCO—, —CONH—, —S—, —Ar—Ar—CH$_2$— (wherein Ar is a phenylene group), methylene group, alkylene group having 2 to 6 carbon atoms and phenylene group, Z is a monovalent group selected from the group consisting of —CF$_3$, —CN, —COCH$_3$, —COOH, —NO$_2$, —SOCH$_3$, —SO$_2$CH$_3$, —F, —Cl and —OCF$_3$, $R^1$ to $R^9$, $R^{11}$ to $R^{19}$, $R^{21}$, $R^{23}$, $R^{24}$, $R^{25}$ and $R^{27}$ to $R^{33}$ are each independently a halogen atom or monovalent organic group, $R^{20}$, $R^{22}$ $R^{26}$ are each independently a divalent organic group, $R^{10}$ is a tervalent organic group, and m and n are each an integer of 1 or more; and wherein said organic solvent is selected from the group consisting of γ-butyrolactam, N,N-dimethylformamide, N,N-dimethylacetamide, 4-hydroxy-4-methyl-2-pentanone, ethylene glycol monomethyl ether, butyl lactate, butyl acetate, methyl methoxy propionate, ethyl ethoxy propionate, ethylene glycol methyl ether, ethylene glycol ethyl ether, ethylene glycol-n-propyl ether, ethylene glycol-i-propyl ether, ethylene glycol-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, and diethylene glycol monoethyl ether acetate.

2. The liquid crystal aligning agent of claim 1, wherein the recurring unit having the above structure (1) is in an amount of 5 to 95 mol % based on the total of all the recurring units of the polymers.

3. The liquid crystal aligning agent of claim 1, wherein the recurring unit having the above structure (2) is in an amount of 0.1 to 50 mol % based on the total of all the recurring units of the polymers.

4. The liquid crystal aligning agent of claim 1, wherein the recurring unit having the above structure (2) is in an amount of 5 to 80 mol % based on the total of all the recurring units of the polymers.

5. The liquid crystal aligning agent of claim 1 which comprises an imidized polymer having an imidization rate of 40% or more as the imidized polymer.

6. The liquid crystal aligning agent of claim 1, wherein the above structure (1) is at least one selected from the group consisting of a structure represented by the above formula (1) and a structure represented by the above formula (2).

7. The liquid crystal aligning agent of claim 1,
wherein when the polymer comprises the polyamic acid the polyamic acid is obtained by reacting a tetracarboxylic dianhydride with a diamine compound and
wherein when the polymer comprises the imidized polymer the imidized polymer is obtained by dehydrating and ring-closing the polyamic acid, at least one of the tetracarboxylic dianhydride and the diamine compound having the above structure (1) or the above structure (2).

8. The liquid crystal aligning agent of claim 7, wherein the diamine compound is a combination of a compound having the above structure (1) and a compound having the above structure (2).

9. The liquid crystal aligning agent of claim 7, wherein the tetracarboxylic dianhydride is at least one selected from the group consisting of 1,2,3,4-cyclobutanetetracarboxylic dianhydride,
1,3-dimethyl-1,2,3,4-cyclobutanetetracarboxylic dianhydride, 2,3,5-tricarboxycyclopentylacetic dianhydride,
1,3,3a,4,5,9b-hexahydro-5-(tetrahydro-2,5-dioxo-3-furanyl)-naphtho[1,2-c]furan-1,3-dione,
1,3,3a,4,5,9b-hexahydro-8-methyl-5-(tetrahydro-2,5-dioxo-3-furanyl)-naphtho[1,2-c]furan-1,3-dione,
bicyclo[2.2.2]-oct-7-ene-2,3,5,6-tetracarboxylic dianhydride,
3-oxabicyclo[3.2.1 ]octane-2,4-dione-6-spiro-3'-(tetrahydrofuran-2',5'-dione),
(4arH,8arH)-decahydro-1t,4t: 5c,8c-dimethanonaphthalene-2t,3t,6c,7c-tetracarboxylic dianhydride, pyromellitic dianhydride and a compound represented by the following formula (19):

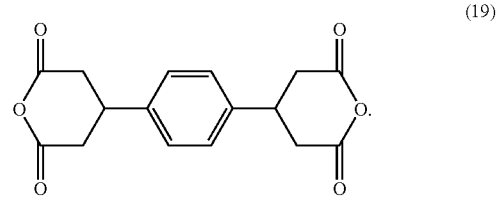

10. A TN or STN liquid crystal display element, which comprises the liquid crystal aligning agent of claim 1.

11. A TN or STN liquid crystal display element, which comprises the liquid crystal aligning agent of claim 3.

12. A homeotropic alignment liquid crystal display element, which comprises the liquid crystal aligning agent of claim 1.

13. A homeotropic alignment liquid crystal display element, which comprises the liquid crystal aligning agent of claim 4.

* * * * *